US012443965B2

(12) United States Patent
Perkins et al.

(10) Patent No.: US 12,443,965 B2
(45) Date of Patent: Oct. 14, 2025

(54) PROOF-OF-STAKE BLOCKCHAIN EMISSION ANALYSIS

(71) Applicant: CoinFund Management LLC, New York, NY (US)

(72) Inventors: Chris Perkins, New Rochelle, NY (US); Christian Murray, Miami, FL (US)

(73) Assignee: CoinFund Management LLC, New York, NY (US)

(*) Notice: Subject to any disclaimer, the term of this patent is extended or adjusted under 35 U.S.C. 154(b) by 104 days.

(21) Appl. No.: 18/465,765

(22) Filed: Sep. 12, 2023

(65) Prior Publication Data

US 2024/0095756 A1 Mar. 21, 2024

Related U.S. Application Data

(60) Provisional application No. 63/525,799, filed on Jul. 10, 2023, provisional application No. 63/406,652, filed on Sep. 14, 2022, provisional application No. 63/375,260, filed on Sep. 12, 2022.

(51) Int. Cl.
*G06Q 30/018* (2023.01)
*G06Q 20/02* (2012.01)

(52) U.S. Cl.
CPC ........... *G06Q 30/018* (2013.01); *G06Q 20/02* (2013.01); *G06Q 2220/00* (2013.01)

(58) Field of Classification Search
CPC ... G06Q 30/018; G06Q 20/02; G06Q 2220/00
See application file for complete search history.

(56) References Cited

U.S. PATENT DOCUMENTS

| 10,423,609 B1* | 9/2019 | Strauss | G06F 16/128 |
| 2019/0164153 A1* | 5/2019 | Agrawal | G06Q 20/065 |
| 2019/0354518 A1* | 11/2019 | Zochowski | G06F 16/2379 |

(Continued)

OTHER PUBLICATIONS

Karakostas, D., Kiayias, A., Larangeira, M. (2020). Account Management in Proof of Stake Ledgers. In: Galdi, C., Kolesnikov, V. (eds) Security and Cryptography for Networks. SCN 2020. Lecture Notes in Computer Science( ), vol. 12238. Springer, Cham. https://doi.org/10.1007/978-3-030-57990-6_1 (Year: 2020).*

(Continued)

*Primary Examiner* — Scott M Tungate
(74) *Attorney, Agent, or Firm* — Fish & Richardson P.C.

(57) ABSTRACT

Methods, systems, and apparatus, including computer programs encoded on computer storage media, for conducting blockchain emission analysis. One of the systems includes a blockchain analysis system (BAS) that can determine a total staking balance for a plurality of validator nodes within a validation network of a blockchain network. The BAS determines, based on the staking balances, a total amount of consensus layer emissions distributed to the plurality of validator nodes over a time period. The BAS determines a total amount of execution layer emissions distributed to validator nodes over the time period. The BAS generates, based on the staking balances and the total amount of consensus and execution layer emissions distributed to the plurality of validator nodes, an average staking return rate; and securely transmits the average staking return rate to an index publishing system.

20 Claims, 8 Drawing Sheets

(56) References Cited

U.S. PATENT DOCUMENTS

| | | | |
|---|---|---|---|
| 2020/0334674 A1* | 10/2020 | Youngblood | G06Q 20/36 |
| 2021/0209483 A1* | 7/2021 | Bose | G06N 5/025 |
| 2021/0304311 A1* | 9/2021 | Banescu | G06Q 40/06 |
| 2022/0067063 A1 | 3/2022 | Chung et al. | |
| 2023/0333939 A1* | 10/2023 | Varadan | G06F 11/1458 |
| 2023/0370276 A1* | 11/2023 | Gutti | H04L 67/1097 |

OTHER PUBLICATIONS

International Preliminary Report on Patentability in International Appln. No. PCT/US2023/032539, mailed on Mar. 27, 2025, 8 pages.

International Search Report and Written Opinion in International Appln. No. PCT/US2023/032539, mailed on Dec. 8, 2023, 15 pages.

Xiao et al., "A Survey of Distributed Consensus Protocols for Blockchain Networks," arXiv, Jan. 29, 2020, 34 pages.

\* cited by examiner

PROOF-OF-STAKE BLOCKCHAIN EMISSION ANALYSIS

CROSS-REFERENCE TO RELATED APPLICATION

This application claims the benefit of U.S. Provisional Application No. 63/375,260, filed Sep. 12, 2022; 63/406,652, filed Sep. 14, 2022; and 63/525,799, filed Jul. 10, 2023, the contents of which are incorporated by reference herein.

TECHNICAL FIELD

This application relates to blockchain technology. In particular, this application relates to technology for interfacing with blockchain validation networks and consensus reward emissions.

BACKGROUND

Proof-of-stake is a cryptocurrency consensus mechanism for processing transactions and creating new blocks in a blockchain. Unlike the original proof-of-work Ethereum, which emits 2 ETH per successful block to miners as a reward/security subsidy, the proof-of-stake beacon chain rewards a network of validators for construction of valid blocks and attestations to the validity of other blocks while also penalizing malicious actors by reducing their stake. Finding the changes in validator staking balances over time allows for an estimate of the variable emissions rate of proof of stake Ethereum to be found. Unlike proof of work systems, where rewards per block are fixed and typically follow a predefined (and often immutable) supply schedule, on the ETH beacon chain the amount of ETH emitted at any block slot is related to the amount of ETH staked by the network as a whole as well as the stake of the validator proposing the block, among other factors.

With the increased adoption of blockchains there is an increasing need for conducting accurate analysis of operations within a blockchain network. As one of the most dominant blockchains today, Ethereum's shift to proof-of-stake (PoS) validation presents a challenge for monitoring and analyzing the operations of the blockchain's validation network and the security of the blockchain. For example, emission analysis for a proof-of-stake blockchain can provide an indication of the emissions rate for measurements from operation of validator nodes that secure the calculations on a blockchain. Changing trends in emissions may provide indications of changes in operations of validator nodes on the validator network that secures the PoS blockchain, and provide indications of the health of a proof-of-stake blockchain. Because beacon chain rewards vary for each block slot relative to operations of validator nodes (e.g., validator staking balances), emissions analysis is more complex for Ethereum than for a proof-of-work blockchain. Therefore, in order to understand operations within Ethereum improved processes for analyzing network emissions are needed.

SUMMARY

The present specification generally relates to systems and processes for conducting emissions analysis of blockchain validation networks. Blockchain validation networks operate to verify transactions on a blockchain and to secure the blockchain. The emission analysis techniques described below provide a window into the health, security, and network traffic within the validation network.

In one general example, innovative aspects of the subject matter described in this specification can be embodied in methods that include the actions of determining a current epoch of validation network associated with a proof-of-stake blockchain including by forming a request message and transmitting the request message to an application program interface (API) of a beacon chain node then receiving a response message containing data identifying a current epoch in the validation network. The method includes storing the epoch data in random access memory (RAM). The method includes accessing the epoch data from RAM and determining, based on the current epoch, a range of epochs that have occurred over a period of time prior to the current epoch. The method includes interacting with the blockchain through the beacon chain node API and identifying, from within each epoch in the range of epochs, a respective end block of the blockchain at the end of the respective epoch. The method includes accessing, through the beacon chain node API, end block data associated with each end block of the blockchain within the range of epochs and storing the end block data in RAM. The method includes accessing the end block data from RAM and extracting state root information for each end block, the state root information providing a state of the blockchain at a time that each end block was appended to the blockchain. The method includes querying a beacon chain API host (BC-API host) for current staking balances for a plurality of validator nodes within the validation network including by transmitting, to the BC-API host, the state root information, and receiving the current staking balances in response; and establishing a secure transmission channel with an index publishing system and securely transmitting the staking balances to the index publishing system using the secure transmission channel.

In another example, innovative aspects of the subject matter described in this specification can be embodied in methods that include the actions of determining, for a time period, a total staking balance for a plurality of validator nodes within a validation network of a blockchain network. The method includes determining, based on the staking balances, a total amount of consensus layer emissions distributed to the plurality of validator nodes. The method includes determining a total amount of execution layer emissions distributed to validator nodes over the time period. The method includes generating, based on the staking balances and the total amount of consensus and execution layer emissions distributed to the plurality of validator nodes, an average staking return rate, and securely transmitting the average staking return rate to an index publishing system.

In another general example, innovative aspects of the subject matter described in this specification can be embodied in methods that include actions of determining a current epoch of a validation network associated with a proof-of-stake blockchain. The method includes determining, based on the current epoch, a range of epochs that have occurred over a period of time prior to the current epoch. The method includes identifying, from within each epoch in the range of epochs, a respective end block of the blockchain added at the end of the epoch. The method includes extracting state root information from each end block, the state root information providing a state of the blockchain at a time that each end block was added to the blockchain. The method includes determining, based on the state root information, staking balances for a plurality of validator nodes within the validation network; and generating, based on the staking balances, an average staking return rate.

Other implementations include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can each optionally include one or more of the additional features described below.

In some implementations, determining the current epoch includes sending a query to an application programming interface associated with the validation network for the proof-of-stake blockchain.

In some implementations, the state root information comprises a root hash of a Merkle tree that stores a current state of network nodes associated with the blockchain.

In some implementations, determining the current epoch includes executing a call to a beacon chain application programming interface (API) of the validation network.

In some implementations, determining the range of epochs includes selecting an epoch that occurred a predetermined number of epochs prior to the current epoch as an endpoint epoch of the range of epochs; and selecting the range of epochs to include a predetermined number of epochs that occurred prior to the endpoint epoch.

In some implementations, determining the staking balances for the plurality of validator nodes within the validation network includes: for each state root contained in the state root information, executing an application programing interface (API) call to a beacon chain client associated with the validator network to obtain validator staking balances for each epoch associated with the state root; and determining a total validator stake balance per epoch.

Some implementations include generating a staking coefficient based on the staking balances associated with the validator nodes, where the staking coefficient is a data standardization value that accounts for network staking differences between epochs, and where generating the staking coefficient includes: determining a first stake amount representing a total validator stake amount as of the current epoch; determining a second stake amount representing a moving average of the total validator stake amount over the range of epochs; and determining the staking coefficient as the ratio of the first stake amount to the second stake amount.

In some implementations, the operations are performed at particular times according to a defined time interval.

In some implementations, the particular time is a time of day less an estimated computational time to perform the operations.

Some implementations include monitoring operation of the validation network, and wherein the operations are initiated at a particular time in response to detecting that the validation network status is operating normally at the particular time.

Some implementations include monitoring operation of the validation network, and wherein the operations are not performed at a particular time in response to detecting that the validation network status is not operating normally at the particular time.

Some implementations include monitoring operation of the validation network, and wherein in response to detecting that the validation network status is not operating normally at a particular time, delaying performance of the operations for at least one time interval from the particular time.

Some implementations include determining, from the end blocks, a total amount of gas used for transactions occurring on the blockchain during the range of epochs; and generating a staking yield from the average staking return rate and the total amount of gas.

This specification uses the term "configured to" in connection with systems, apparatus, and computer program components. That a system of one or more computers is configured to perform particular operations or actions means that the system has software, firmware, hardware, or a combination of these installed that in operation, cause the system to perform those operations or actions. That one or more computer programs is configured to perform particular operations or actions means that the one or more programs include instructions that, when executed by data processing apparatus, cause the apparatus to perform those operations or actions. When special-purpose logic circuitry is configured to perform particular operations or actions, the circuitry has electronic logic that performs those operations or actions.

The subject matter described in this specification can be implemented in various implementations and may result in one or more of the following advantages.

For example, PoS blockchains emission analysis techniques provide a window into the health, security, and network traffic within the validation network. Furthermore, through the analyses described below, blockchain network security can be monitored and improved. For instance, the emission analysis processes described below differentiate between consensus layer and execution layer emissions. Consensus layer emissions are a function of the number of validators that are securing a blockchain validation network. Increasing the number of validators improves the overall security of the validation network. As the number of validators increases, consensus layer emission rates reduce. Emission analysis can provide insight into the movement of consensus layer emission rates and indicate the health of the validation network. As consensus layer emission rates increase (indicating reducing network security), the analysis techniques described below can be used to trigger additional validator nodes to join the network and boost security.

In some examples, emissions analysis enables scheduling blockchain transactions around periods of high network traffic, thereby improving the overall efficiency of transaction processing by the validation network. For instance, execution layer emissions indicate network activity. Periods of increased network activity, e.g., increased transaction traffic, results in increased execution layer emissions and increased execution layer emission rates. Emission analysis can provide insight into the network activity that enables users, e.g., through smart contracts, to schedule transactions around such periods, and thereby, reduce transaction congestion within the network.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A blockchain is a type of large database called a distributed ledger system wherein collections of data (such as transaction records) are stored in "blocks" that are chained together using cryptography such that they cannot be changed later. A blockchain is distributed among a network of processing nodes (described below), where each node stores a partial or full copy of the blockchain.

Each block of a blockchain contains a header and one or more transaction records. The header contains information about the block itself and a reference to the previous block—in technical terms, this is typically a cryptographic hash of the previous block's header. Each block thus stores information about recent transactions and is cryptographically linked (e.g., "chained") to the previous block.

A common example of how cryptocurrencies typically work follows. When a user ("A") wants to initiate a transaction with another user ("B"), they send a message to the network stating, for example, "A sends five Ether to B." Each node will then reference the existing chain of transactions to confirm that A has the necessary funds to transfer to B. If a sufficient number of the nodes in the network reach a consensus that A has the necessary funds based on the copy of the blockchain available to them, the nodes will add the transaction record to the current block.

Two popular mechanisms for creating consensus are proof-of-work (PoW) and proof-of-stake (PoS). PoW is typically done through a network of miners who receive Ethereum as a reward and as a transaction fee. This is a competitive system that uses large amounts of energy and computational power. On the other hand, in a PoS network validator, nodes are chosen at random to confirm transactions and to propose new blocks based on an amount of native cryptocurrency staked by the validator. Other validator nodes then "vote" or "attest" to the validity of a proposed block. Once the proposed block is accepted by a threshold number of validator nodes, it is added to the blockchain. Consensus layer and execution layer rewards are provided to validator nodes that participate in the creation of a new block by proposing new blocks and/or attesting to the validity of proposed blocks. PoS blockchain networks provide some advantages to PoW blockchain networks, in that they use significantly less computational resources and computational energy.

Figure 1:
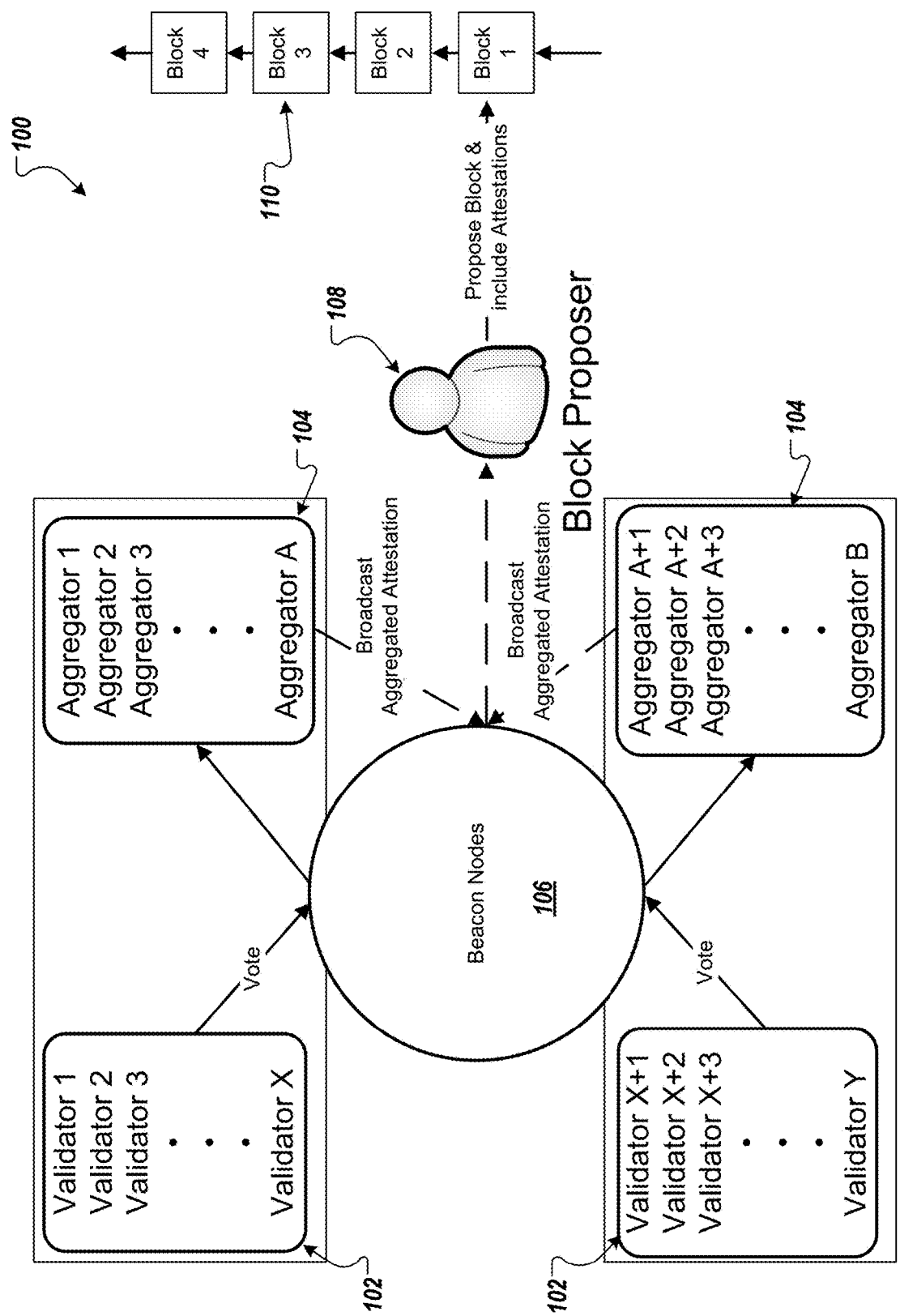
FIG. 1 is a diagram of an example consensus process for a PoS blockchain network.

FIG. 1 is a diagram of an example consensus process for a PoS blockchain network 100. The network includes validators (e.g., validator node) 102, aggregators 104 (e.g., execution node), and beacon nodes 106 (e.g., consensus client). A network node is any computer or electronic device that runs the blockchains client software. In some cases, a node is an instance of the software itself, and not a single particular hardware device. For example, one instance of the blockchain software can be run on multiple hardware devices. Similarly, a single hardware device (or group of hardware devices) can execute a combination of aggregator and consensus software or aggregator, consensus, and validator software. Validators 102 are nodes that execute validation software and participate in validating transactions (e.g., adding blocks to the blockchain) and securing the blockchain network. Aggregators 104 are nodes that listen for new transactions broadcast to the network, verify the validity of the transaction, and add the new transactions to a list of transactions to be processed (e.g., the mem pool). Beacon nodes 106 implement the blockchain network's consensus algorithm.

During the validation process, one validator 102 is elected randomly as block proposer 108 for each new block added to the blockchain 110. The block proposer 108 selects transactions to be added to a new block, generates the new block, and passes the proposed block to other validators 102 for attestation (e.g., voting). The other validators 102 verify the transactions in the proposed new block and verify the block is a valid next block in the blockchain 110. If the new block is proper, the validators 102 submit their attestation to the network 100. The beacon nodes 106 verify sufficient attestations have been received, thus the new block is accepted by the network 100 and added to the blockchain 110 by the network. In some instances, committees of validators 102 are selected for attestations, rather than the full network of validators 102 voting on every block. For instance, in some examples, groups of validators 102 are chosen to collect data from the full network. The individual attestations of the validators 102 are merged into a single attestation. The single collective attestation is then broadcasted to the network.

Figure 2:
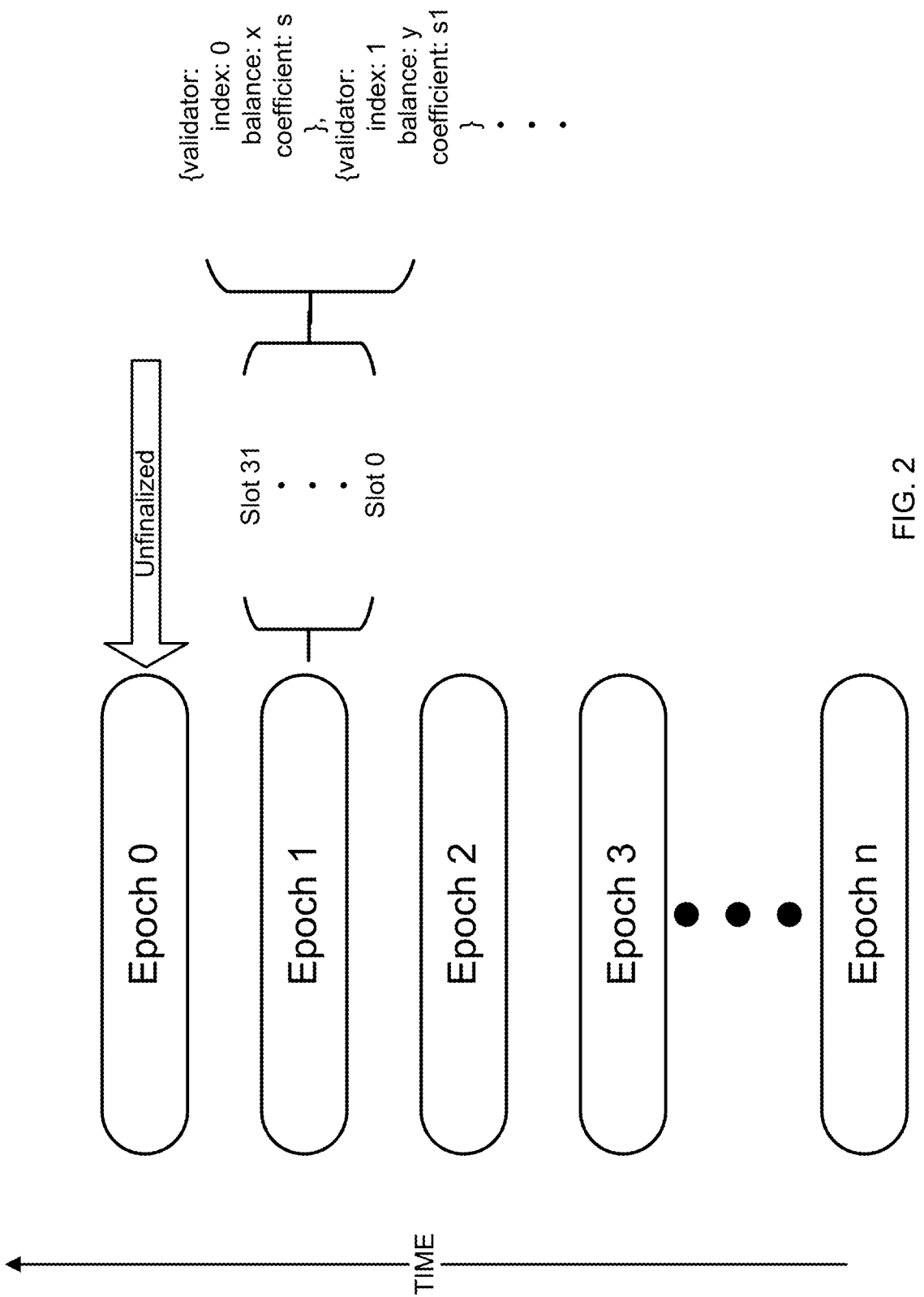
FIG. 2 is a diagram of timing events within a PoS validation network.

FIG. 2 is a diagram of timing events within a PoS validation network 100. The network operations are segmented into slots and epochs. Each epoch includes a number of slots (e.g., 32 slots) during which validators 102 propose and vote on new blocks. A new block proposer 108 can be elected for each slot. The time between blocks can be fixed, allowing for increased speed and security of the blockchain 110. An unfinalized epoch is the newest epoch that is being built and voted on by validators 102. Finalized epochs are fully voted on and unlikely to be revisited. Each epoch can include information provided from the validators 102.

Figure 3:
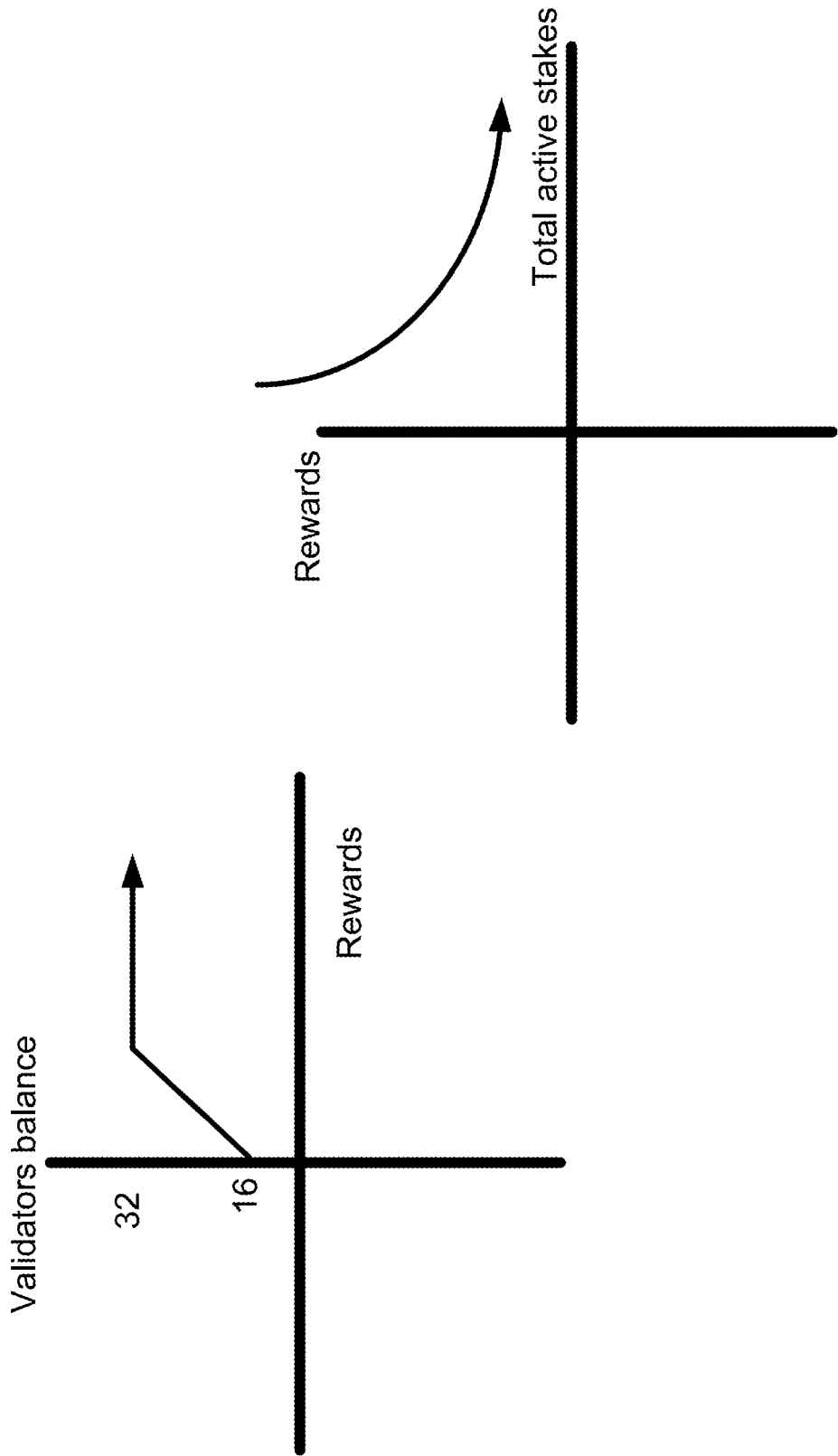
FIG. 3 depicts graphs representing the comparison of rewards against validator staking balances and rewards against active stakes for a PoS blockchain network.

The validators 102 are rewarded for the services they provide to the blockchain network 100. These rewards are emissions of the blockchain network. There are two general types of emissions: consensus layer emissions and execution layer emissions. FIG. 3 depicts graphs representing the comparison of consensus layer emissions against validator staking balances and rewards against active stakes. In some examples, the validator staking balance can be material up to 32 ETH and down to 16 ETH (the range of 'effective balances'). In other examples, the ranges could vary. In these examples, the range in which their performance can be affected is relatively narrow. However, the range of the total active stake is {0, ∞}, so there is more room to affect performance. For example, if there is only one validator on the network, that validator would get 100% of all emissions when the average effective stake remains relatively constant, but the base reward goes→∞. If there are infinite validators on the network, the base reward goes to 0.

In some implementations, e.g., with Ethereum, there are parallel balances of Ethereum to be considered. One balance is the overall circulating supply of Ethereum, which is currently about 120 million. Unlike Bitcoin, the supply of ETH before and after the merge is uncapped; the network is secured in part by emissions. Under proof of work, miners receive a block subsidy similar to bitcoin miners, and following the transition to proof of stake validators leads to receiving a variable reward that is primarily proportional to the stake of the validator and the number of valid attestations the validator includes in a proposed block, while being inversely proportional to the square of the total active stake across the entire network.

Rewards paid out to validators can be calculated on an epoch-by-epoch basis at a global level. This is because each validator can view the balance of all other validators on the network at any given time, and also because the reward payouts are calculated per-epoch (and not per block) after that epoch is finalized. The total number of ETH emitted at any time is only a value, not a rate. A rate can be calculated from one of two global values: the total circulating supply of ETH (including both ETH on the execution layer and ETH staked in validators) or from ETH staked in validators alone. Calculating a rate using the total supply of ETH gives the emission rate of the entire network, which may become negative due to the effects of EIP-1559 (discussed below). Calculating a rate using the active validator stake will give the average rate of return of a validator, e.g., a 'staking return rate'. This represents the percentage increase in the balance an average validator should expect over a one-year period. For any individual validator, this balance could be negative, but cannot be negative globally. The reward also includes the ETH paid to validators in the form of transaction fees, which they will begin receiving after the successful completion of the merge.

Validator operations and staking balances may change over time due to performance and operational differences between network validators, the addition of new validators to the network, and validator stake withdrawals/additions. A validator coefficient can be generated that smooths or standardizes variation in network staking balances and/or validator operational performances over multiple epochs. Two exemplary implementations of a validator coefficient are discussed below.

In some implementations, one way of accounting for the potential differences in earnings between validators and between days for an individual validator is to measure a coefficient of a validator's earnings, using this to smooth out variations in the amount of ETH a validator has received at the current slot as it is applied to the running total.

For example, validators may earn differentially because of the total active stake they control, which influences how frequently they can propose blocks, and because of inactivity or downtime, which can incur penalties. Although expected to be rare, bugs in software and/or malicious activity such as making dual proposals for the same slot can also result in slashing, or a reduction in stake.

In order to smooth over these differences, a server can apply the validator coefficient to each balance when performing an update to the rate. The coefficient can be defined as:

$$s = 1 - m \quad (1)$$

Where m is the percentage difference between the mean balance change of the validator over the last n epochs and the current balance change. The coefficient can be calculated for each validator v and applied at each reported validator staking balance vb.

However, as the number of validators in a PoS validation network increases, the number of computations to perform blockchain emission analysis and validator coefficient increases significantly. For example, the number of computer operations required can quickly rise to hundreds of millions of operations per day. The computational efficiency of processors or servers performing blockchain emission analysis can be improved significantly using a global validator coefficient. For instance, a global validator coefficient (discussed below) may improve computational efficiency by reducing daily computer operations to several hundred operations. Furthermore, reducing computations can reduce energy usage, which results in a smaller carbon footprint for a blockchain analysis system.

A pertinent factor at play when annualizing a staking return (e.g., a daily staking return) is the fact that the total stake of the network is expected to continue to expand (and possibly contract following the Shanghai upgrade). Capturing information about the total stake of the network informs a validator's potential future earnings more than the performance of that validator historically. This is due to the fact that the base reward, which is the main variable that controls the amount of Ethereum that a validator gets at each epoch that is finalized, is proportional to two factors: i) the total stake of the network and ii) the active stake of that validator. Because the relationship between total active stake on the network and base reward is the inverse of the square root of the total stake, this value has an outsized impact on the rewards (if total stake on the network goes up by 4×, then average validator rewards go down by 2×).

The ratio is that of the total active stake of the network at the current ending epoch of a particular measurement period over the n epoch moving average of the total active stake on the network as measured by a validator network analysis server (e.g., a blockchain analysis system). This value will suggest whether or not the total balance of the network is increasing or decreasing, and thus informs how a validator should expect their rate to perform assuming prior network conditions persist.

$$\text{globalCoefficient} = (\text{totalStake}_{current}) / (\text{totalStake}_{movingAverage}) \quad (2)$$

This global coefficient can be applied to the final rate in some implementations of the emission analysis process. Once the global coefficient, c, is incorporated into the calculation, the overall formula for the staking return rate (or "SR") becomes:

$$SR = \left( \sum_E \left[ \frac{V_n - V_m}{V_m} \right] / (E - 1) \right) \times c \times 225 \times 365 \quad (3)$$

Or, the change in epoch-to-epoch average validator staking balance across all epochs, multiplied by the coefficient, annualized. Where:

E = the total number of epochs being considered (usually 225 in a 24-hour period)

$V_n$ and $V_m$ = validator staking balances at the current epoch+1 and the current epoch, respectively (E−1)=the number of transitions or 'rate changes' that occur for a given set (239, because the first epoch considered is the starting value)

C=the coefficient; the ratio of the moving average of total stake in the past to the current total stake 225*365=the annualization formula (225 epochs/day, 365 days/year).

In addition to the staking return rate, the average fees received by validators are also included, which are found by summing the priority fee of each observation period, annualizing the value, and dividing by the total staked supply. Priority fees can be calculated by subtracting the base fee from the total gas cost of each transaction.

EIP-1559 was introduced via hard fork upgrade in August 2021 to the Proof-of-Work Ethereum chain, which is slated to become the 'execution layer' of Ethereum following the merge. One important aspect of EIP-1559 is that it changes the way in which fees are handled by the network; previously, Ethereum miners received a 2 ETH block subsidy plus 100% of all transaction fees paid by the transactions they included in a block. After EIP-1559, the fees paid for each transaction were split in two; the base fee (calculated by the network dynamically) and the miner tip, which is an elective fee paid on top of the base fee in order to incentivize miners to include a particular transaction in a timely manner. The base fee is burned by the network for all transactions. Because this activity is occurring at the level of the execution layer, and not at the consensus layer where new emissions are taking place, the effect of supply reduction from this upgrade is not relevant to the calculation of the rate.

Methodology of Calculation

One implementation of the calculation will employ an ETH beacon chain node in order to receive information about each validator's stake at a given state root and in addition, access to the beaconcha.in API is obtained in order to determine which state roots to consider based on the epochs in question.

Ethereum beacon chain nodes index only by block state roots and not by epoch number. Therefore, in order to take epoch-wide measurements, the final block of all epochs required can be obtained from systems such as beaconcha.in API.

For example, first a call to /api/v1/epoch/{epoch} (beaconcha.in API) is made with the parameter 'latest'. This obtains the currently un-finalized epoch on the network.

Next, starting from a number of epochs behind this called value, gather the state root of the last block of the epoch for 225 epochs (corresponding to one day) from this same endpoint. In some implementations, a four-epoch lookback can be used to ensure all epochs being considered are finalized. The state root is the index that can be subsequently used to find validator staking balances.

For each of the obtained state roots, query a beacon chain REST API (e.g., quicknode/eth/v1/beacon/states/{state_id}/validator_balances at each stateroot.

Validators are sorted by index in the returned data.

| Index | Balance |
|---|---|
| 0 | 0 | 35.876074 |
| 1 | 1 | 36.117846 |
| 2 | 2 | 35.976121 |
| 3 | 3 | 35.758063 |
| 4 | 4 | 35.884326 |

Divide balances by 10^9 to convert from GWEI to ETH (for readability). Find the epoch-to-epoch percentage change in average balance for each epoch in the list. Average this list of balance percentage changes and annualize by multiplying by 225 then 365. Find the sum of all priority fees paid during this window. Divide by the total active stake of the first epoch in the observation period. Add this percentage rate to the staking return rate already calculated.

Infrastructure

ETH beacon chain node RESTful API: for example, a beacon chain API host (BC-API host), such as Quick Node or Blockdaemon beacon chain client with a REST API. The beacon chain node also depends on a fully synchronized geth client of the execution layer (eth1.0) in order to function. In some implementations, a BC-API host can manage the running of these clients on behalf of a validator network analysis server system. In some implementations, the validator network analysis server beacon chain client can be hosted on the validator network analysis server system, e.g., to improve security by eliminating the need to expose the beacon chain's REST API to the open internet or any other servers, which if done can increase the risk of bringing down the node via Distributed Denial of Service (DDOS) style attack.

Beaconcha.in API—for fetching global data such as the current epoch and total validator staking balances across the entire network.

The server will run once per sampling window and provide raw data via Secure File Transfer Protocol (SFTP) connection. Multiple servers across different regions can provide the data simultaneously to the same endpoint. In some examples, the same server can run the ETH beacon chain client. This maximizes security by eliminating the need to expose the beacon chain's REST API to the open internet or any other servers, which if done can increase the risk of bringing down the node via DDOS style attack.

The staking return rate is obtained by first determining the current epoch number from an API such as beaconcha.in, then using the current epoch number to determine the range of epochs (including the buffer for potential non-finalized epochs) for the desired 24-hour period. Then, the last block's state root is stored for each epoch and used to query the global validator staking balance for all epochs.

The validator coefficient (defined above) can be calculated over a historical period of n epochs and applied to the final rate. The balances and coefficients are gathered across each epoch, then can be provided via SFTP to third party servers (e.g., index publisher systems).

Figure 4A:
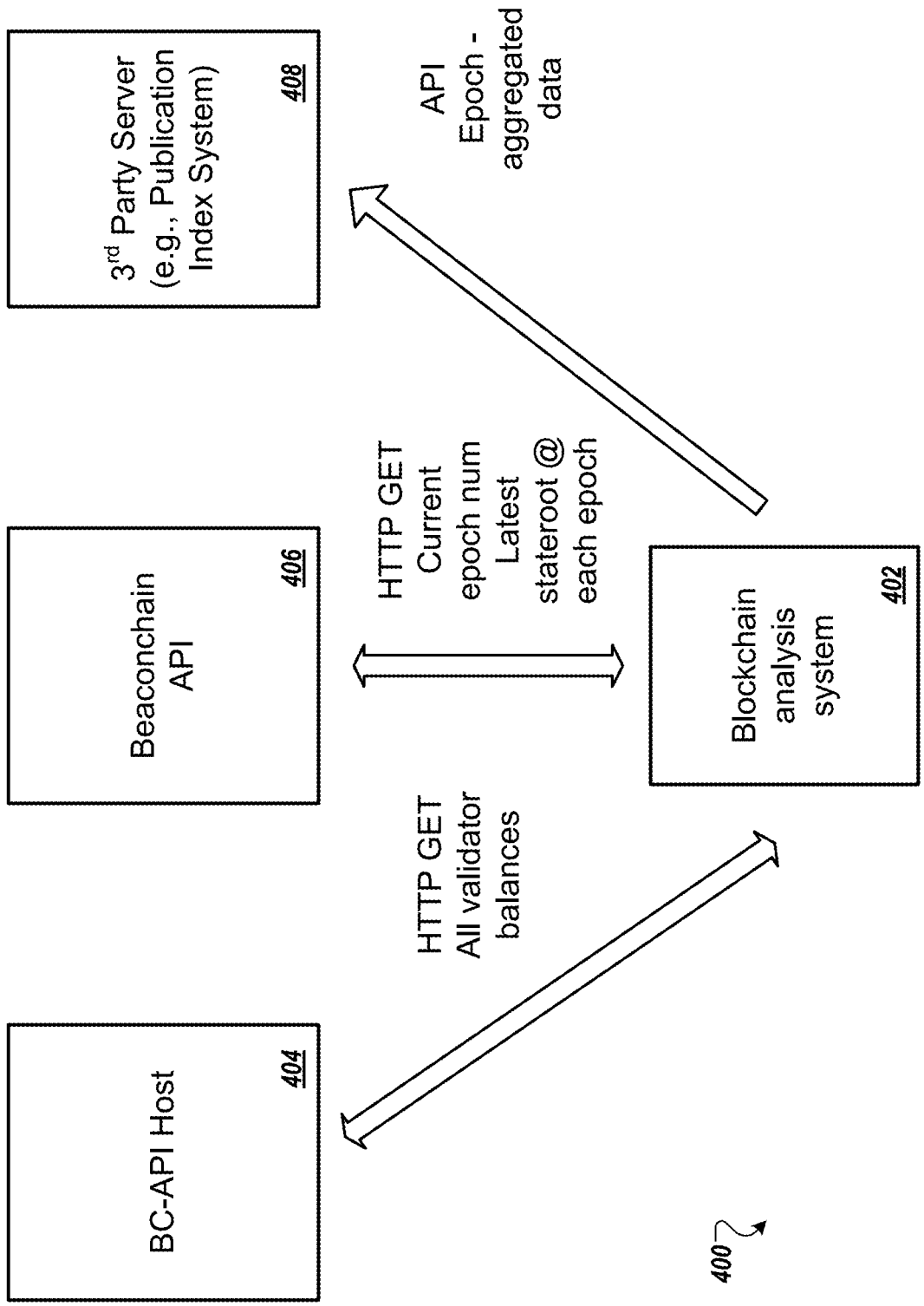
FIG. 4A is a block diagram of example operating environment.
Figure 4B:
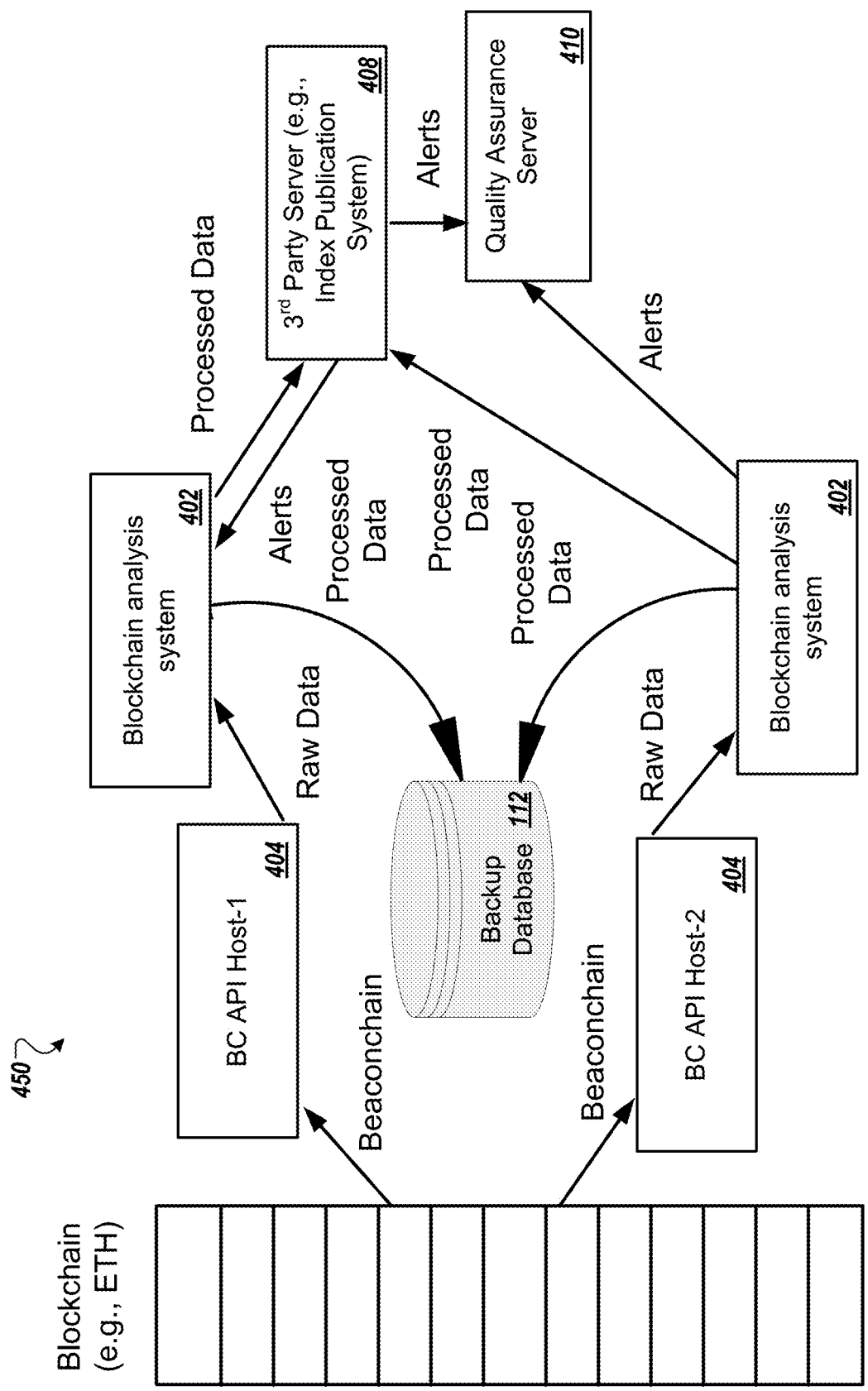
FIG. 4B is a block diagram of another example operating environment and process flow.
Figure 4C:
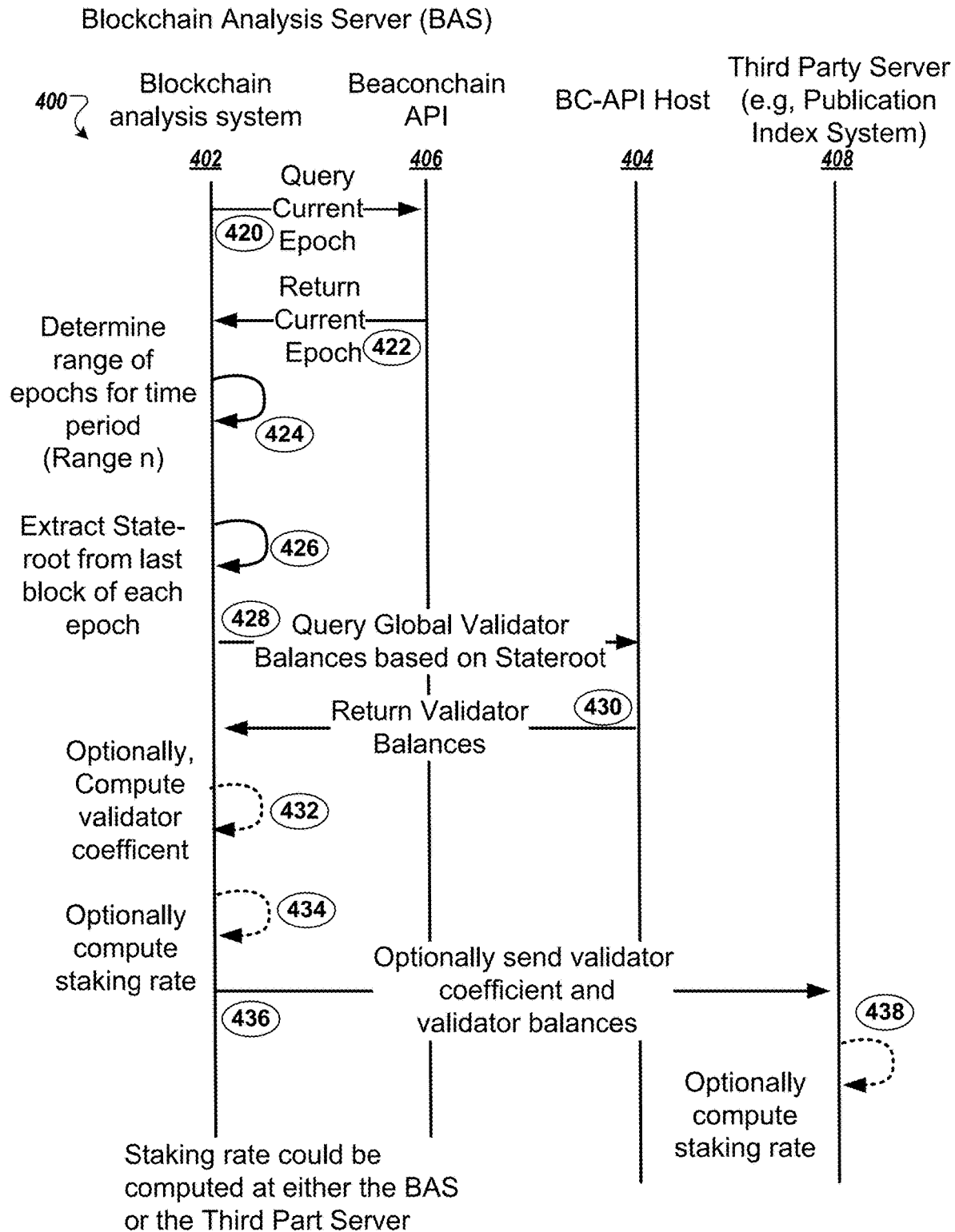
FIG. 4C is a waterfall diagram that illustrates an exemplary execution process of communications between systems within either example operating environment.

FIG. 4A-C depict block diagrams of example system operating environments and process flows for performing blockchain emission analysis. FIG. 4A is a block diagram of example operating environment 400. FIG. 4A includes a blockchain analysis system 402 that can pull data from the BC-API host 404 and the beacon chain API 406 in order to calculate and publish the results with the index publication system 408. FIG. 4B is a block diagram of another example operating environment 450 and process flow. FIG. 4C is a waterfall diagram that illustrates an exemplary execution process of communications between systems within either example operating environment 400 or 450.

The blockchain analysis system 402 can be a server or combination of servers operating to interact with a blockchain validation network and analyze blockchain emissions. The blockchain analysis system 402 can run virtually within a server. The blockchain analysis system 402 can host other software clients that execute one or more of the process steps discussed below.

The BC-API host 404 can be a server or combination of servers. In some instances, the BC-API host 404 can be a software client executed across multiple servers (e.g., as a cloud service). In some examples, the BC-API host 404 executes a beacon chain REST API that provides interaction with a blockchain, blockchain nodes, a blockchain validation network, or any combination thereof.

The index publication system 408 can be a server or combination of servers. The index publication system 408 publishes analysis results from the blockchain analysis system 402 on a publicly accessible forum, e.g., a webpage graphical user interface (GUI).

In some implementations, there is an additional quality assurance system 410. This quality assurance system 410 can be another server or can operate as a component of one or multiple blockchain analysis systems 402. In some implementations the quality assurance system 410 can include a Slack Server or any other equivalent communication forum. This quality assurance component 410 can receive alerts and transmit the alerts to applicable users.

In some implementations, the system can include a backup database 112. The backup database allows for redundancy and protection of the processed data. In some implementations the backup database stores more than the processed data and may backup various components of the system. The backup database can coincide with the system 402 or exist elsewhere in the environment 400 or 450.

In some implementations, a redundant process flow (as depicted in FIG. 4B) can be used for the blockchain emissions analysis and SR computation. The process shown in FIG. 4B is generally similar to that shown in FIG. 4A, but includes two or more processing routes. For instance, two independent blockchain analysis systems 402 are employed to perform the blockchain emission analysis each time period. Each blockchain analysis system 401 communicates with an independent BC-API host 404 to obtain raw blockchain data (e.g., validator staking balances and transaction fees) for the epochs included in an observation period. Each blockchain analysis system 402 can process the raw data independently to perform the emissions analysis. The analysis results can be sent to a third party system 408 (e.g., an index publisher) to publish the SR for the observation period. Optionally, the third party system 408 can compute the SR from the processed data. In some implementations, the third party system 408 can compare the independently produced processed data and alert a blockchain analysis system to any discrepancies. In some implementations, the independent processed data is also stored/archived on a backup database 112.

In operation, the blockchain analysis system 402 can query the beacon chain API 406 for the most recent or current epoch (420). This can occur through various prompts between systems and can occur in response to other criteria. In some instances, the query is based on timing, the number of validators available, the number of stakeholders, or any combination thereof. The beacon chain API 406 returns the queried information to the blockchain analysis engine 402 (422). The format of the query and of the returned message can change based on the network and the API protocols. The blockchain analysis system 402 can interact with more than one beacon chain API in order to satisfy the query, as depicted in FIG. 4B.

The blockchain analysis system 402 determines a range of epochs for a given time period (424). In some implementations, the time period is a predetermined observation period, e.g., 24 hours. The blockchain analysis system 402 can use the time period to determine the epochs that have passed within the validation network during the time period.

The blockchain analysis system 402 stores the retrieved query information and all the data received based on the defined time period. Using the stored information, the blockchain analysis system 402 can perform analysis of the data to determine both the range of epochs in the time period, and identify a respective end block of each epoch. In some instances, the respective end block of each epoch is queried separately by the blockchain analysis system 402 from the beacon chain API 406.

The table below illustrates an example process for identifying epochs within an observation period.

| Epoch | Activity |
|---|---|
| e | Current epoch when calculation begins |
| e-4 | End of observation period |
| e-228 | Start of observation period |

For example, if the current epoch at the beginning of the observation period (p) is epoch 500, then the first epoch for the observation period is epoch 272 and the last epoch for the period is epoch 496. In other words, observation period (p) would include epochs 272 through 496.

In some implementations, the observation period is determined based on the active epoch number at a defined observation time for each of two consecutive observation periods. For example, the Observation Period (p) can be one day, defined as the period between the observation time t (e.g., 1300 US Eastern Time) at the present day (e.g., observation period p) and the same local time t on the previous calendar day (e.g., observation period p−1), subject to a lag adjustment designed to help ensure epochs included in the observation period are finalized. (Note that in some implementations, the observation period on days where clocks are changed for daylight savings time may be longer or shorter than other days. On days when clocks are not adjusted and the Ethereum network experiences no disruptions, the observation period aims to capture 225 epochs. The observation period can be adjusted by a four-epoch lag to reduce the occurrence of unfinalized epochs in the observation period. Each Observation Period will begin and end by epoch reference as shown in the table below:

For any observation period (p), e.g., one day nominally including 225 epochs:

| Epoch Description | Defined as: |
|---|---|
| First epoch included in the current observation period (p) | Active epoch number at the observation time of the previous observation period (p-1) minus 4 epochs |
| Last epoch included in the current observation period (p) | Active epoch number at the observation time of the current observation period (p) minus 5 epochs |

For example, if the active epoch at the observation time of the observation period (p) is epoch 500, and the active epoch at the observation time of the previous observation period (p−1) is epoch 275, then the first epoch for the observation period (p) is epoch 271 and the last epoch for the current observation period (p) is epoch 495. In other words, observation period (p) would include epochs 271 through 495.

In such implementations, the identification of the active epoch at the observation time for each observation period is stored, in order to identify the epochs to be included in a subsequent observation period.

The blockchain analysis system 402 can use the determined or queried endpoints to extract the state root from the last block of each epoch (426). The blockchain analysis system 402 can utilize various methods e.g., as discussed below in reference to FIGS. 5A and 5B, to access the block at an identified block height and obtain the state root information.

The blockchain analysis system 402 can query for current staking balances of all the validator nodes within a given validation network based on the state root information of the end blocks (428). In some implementations, the query is formulated by the blockchain analysis system 402 using the state root information. In some implementations, the blockchain analysis system 402 includes the state root information in the query. The blockchain analysis system 402 can send the query to various locations in the validator network, for example a BC-API host 404. The BC-API host 404 can receive and process the query to return the requested data (430). The BC-API host 404 may use information from the query to process the data and send the response.

In some implementations, the blockchain analysis system 402 can use the returned query of validator staking balances to compute a validator coefficient (discussed in more detail above) (432). In some instances, this computation can include generating a staking coefficient based on the staking balances associated with one or more validator nodes. In some instances, the staking coefficient is a data standardization value that accounts for network staking differences between epochs. The blockchain analysis system 402 can generate the staking coefficient by, e.g., determining a first stake amount representing a total validator stake amount as of the current epoch, and determining a second stake amount representing a moving average of the total validator stake amount over a range of epochs for the observation period. The blockchain analysis system 402 can compute the staking coefficient as the ratio of the first stake amount to the second stake amount, as discussed above.

In some implementations, the blockchain analysis system 402 can, optionally, determine the total execution layer emissions (e.g., rewards) distributed to validator nodes over the observation period. The execution layer emissions can include execution layer rewards such as additional gas fees that are not burned e.g., gas tips provided to validator nodes for prioritizing blockchain transactions. For example, the blockchain analysis system 402 can determine execution layer emissions distribution on an ongoing e.g., real-time, basis during an observation period. The blockchain analysis system 402 can regularly interface with the BC-API host 404 to obtain block data for each block during each epoch of the observation period. For example, at intervals (e.g., each slot time, epoch time, or block time) the blockchain analysis system can send a block request to the BC-API host to obtain updated block data. The blockchain analysis system 402 can scan transactions processed in each block received in the block data to identify execution layer rewards provided to the validator node of that block and maintain a running tally of all execution layer emissions for a given observation period.

The blockchain analysis system 402 can compute the staking return rate (434). For instance, in some implementations, this staking return rate (SR) can be calculated completely or partially by the blockchain analysis system 402. The blockchain analysis system 402 can send the staking return rate to one or more third party systems (e.g., an index publishing system 408, a DeFi system, or other systems running smart contracts). In some implementations, the blockchain analysis system 402 can send the staking information, validator balances, execution layer emissions data, and validator coefficient (if calculated) to an index publication system 408 (436), and the index publishing system can generate the staking return rate (438).

The staking return rate can be generated, e.g., using the techniques discussed above (e.g., equation 3). In some instances, the calculation is based on stored information within the blockchain analysis system 402. In some instances, the blockchain analysis system 402 performs more queries to other systems to request more information for the calculation, or to query another API to complete the calculation.

The staking return rate can be calculated daily, e.g., based on the formula below:

$$SR = \left( \frac{\sum_1^n \frac{(VB_{n,p} - VB_{n,p-1})}{VB_{n,p-1}}}{n} + \frac{F}{TS_{p-1}} \right) \times 365 \qquad (4)$$

where $VB_{n,p}$=current balance of validator n at the end of the current observation period (p), $VB_{n,p-1}$=current balance of validator n at the beginning of the current observation period (e.g., the end of the previous observation period (p−1)), F=sum of transaction fees (e.g., blockchain gas) accrued to all validators during the current observation period, $T_{p-1}$=total stake of the network across all validators at the beginning of the observation period, and n=number of eligible validators.

The difference $VB_{n,p}-VB_{n,p-1}$ represents consensus layer emissions (e.g., rewards). These are validator rewards generated by the blockchain protocol and provided to the validator nodes as incentives to validator nodes for securing the network. The transaction fees (F) represent execution layer emissions. These are validator rewards provided by users as incentives to prioritize certain transactions. They typically represent an un-burned portion of transaction gas fees.

The calculation of SR can be initiated at a particular time during each period (e.g., 1300 Eastern Time each calendar day) based on the observation period described above.

In some implementations, staking return rate can be calculated to account for withdrawals from validators during the observation period. For example, the staking return rate can be calculated daily based on the formula below:

$$SR = 365 \times \left( \frac{1}{n} \times \sum_1^n \frac{(VB_{n,p} + W_n - VB_{n,p-1})}{VB_{n,p-1}} + \frac{F}{TS_{p-1}} \right) \qquad (5)$$

where $VB_{n,p}$=current balance of validator n at the end of the current observation period (p), $W_n$=partial withdrawals deducted from the current balance of validator n during the current observation period, $VB_{n,p-1}$=current balance of validator n at the beginning of the current observation period (e.g., the end of the previous observation period (p−1)), F=sum of transaction fees (e.g., blockchain gas) accrued to all eligible validators during the current observation period, $TS_{p-1}$=total stake of the network across all eligible validators at the beginning of the observation period, and n=number of eligible validators.

The term $VB_{n,p}+W_n-VB_{n,p-1}$ represents consensus layer emissions (e.g., rewards) corrected for staking withdrawals.

Eligible Validators

In some implementations, the process can exclude data from the valid validators. For each observation period, eligible validators may include all validators that meet all of the following requirements:

The validator is active for the duration of the Observation Period. (e.g., being active requires the validator to maintain a current staking balance of at least 16 ETH); and The validator does not deposit ETH during the Observation Period. (e.g., validators whose current staking balance has increased by 1 ETH or more during an observation period may be deemed to have made a deposit and are therefore ineligible for that observation period).

For example, the blockchain analysis system 402 can parse the individual validator staking balances to identify inactive validators, and exclude the staking balance of inactive validators from the staking return rate calculation. Similarly, the blockchain analysis system 402 can parse transactions for each validator to identify deposits that are not related to block chain emissions, and identify validators with non-emission deposits as ineligible for that observation period. The blockchain analysis system 402 can then exclude the staking balance of those validators from the staking return rate calculation. In some examples, an eligibility threshold value can be set. The eligibility threshold value can represent a value greater than any expected balance increase due to blockchain emissions alone over an observation period, for a given blockchain (e.g., 1 ETH). Thus, any staking balance increase greater than the eligibility threshold would represent a non-emission deposit. The blockchain analysis system 402 can compare start and end staking balances of each validator over an observation period to an eligibility threshold. Any validator with a staking balance increasing by more than the eligibility threshold would be indicated as ineligible for that observation period. The blockchain analysis system 402 can then exclude the staking balance of those validators from the staking return rate calculation.

In some implementations, the blockchain analysis system 402 can generate individual consensus layer and execution layer emission rates. For example, the blockchain analysis system 402 calculates a daily consensus layer return rate (CLRR) based on the formula below:

$$CLRR = 365 \times \left(\frac{1}{n} \times \sum_1^n \frac{(VB_{n,p} + W_n - VB_{n,p-1})}{VB_{n,p-1}}\right) \quad (6)$$

Likewise, the blockchain analysis system 402 can calculate a daily execution layer return rate (ELRR) based on the formula below:

$$ELRR = 365 \times \left(\frac{F}{TS_{p-1}}\right) \quad (7)$$

In some implementations, the blockchain analysis system 402 can compute raw emissions over an observation period (e.g., a day) and distribute the raw daily emissions data to the index publication system 408 and/or other third party systems. For example, raw daily execution layer emissions are represented by F. Raw daily consensus layer emissions per validator can be represented by:

$$\left(\frac{1}{n} \times \sum_1^n VB_{n,p} + W_n - VB_{n,p-1}\right) \quad (8)$$

Each of these data can also be sent to the index publication system 408 and/or other third party systems.

In some implementations, the staking emission analysis and staking return rate (SR) computation method can be determined as an average over a predefined blockchain observation period (e.g., 24 hrs). For example, the block chain observation period (p) can be one day, or 225 epochs, and seeks to include only validated blocks. To help ensure only validated blocks are included, the observation period for each calculation can gather data from the prior 225 epochs while excluding a number (e.g., three to ten epochs) of the most recent epochs.

In some implementations, the blockchain analysis system 402 outputs are verified for accuracy. For example, the quality assurance system 410 can receive output calculations and or raw data from the blockchain analysis systems 402. The quality assurance system 410 compares the data from each blockchain analysis system 402 for consistency and accuracy, e.g., to verify both the calculations and proper operation of each blockchain analysis system 402 operating in the environment 450. If a discrepancy in the data arises, the quality assurance system 410 can alert the blockchain analysis system 402 and/or users of the blockchain analysis system 402. For example, the quality assurance system 410 can post alerts to a slack server monitored by the blockchain analysis system 402 and blockchain analysis system users/managers.

In some implementations, the BAS provides a window into the health, security, and network traffic within the validation network. Consensus layer emissions are a function of the number of validators that are securing a blockchain validation network. Increasing the number of validators generally improves the overall security of the validation network. As the number of validators increase, consensus layer emission rates reduce. Emission analysis can provide insight into the movement of consensus layer emission rates and indicate the health of the validation network. For example, the BAS output rates discussed above can be provided to smart contracts used to control staking and or operation of validator nodes. As consensus layer emission rates increase (potentially indicating reducing network security), a smart contract can be triggered when the SR and/or CLRR rise above a threshold level triggering more ETH to be staked in idle validators, thereby increasing network security.

In some examples, emissions analysis enables scheduling blockchain transactions around periods of high network traffic, thereby, improving the overall efficiency of transaction processing by the validation network. For instance, execution layer emissions indicate network activity. Periods of increased network activity, e.g., increased transaction traffic, results in increased execution layer emissions and increased execution layer emission rates. Emission analysis can provide insight into the network activity that enables users, e.g., through smart contracts, to schedule transactions around such periods, and thereby, reduce transaction congestion within the network. For example, the BAS output rates discussed above can be provided to smart contracts (e.g., for a DeFi system) that are used to schedule when to execute certain types of blockchain transactions. For instance, if ELRR rises above a threshold level, indicating high network traffic, a smart contract can use that as a trigger to delay specific transactions, or to estimate fees to be paid in order to prioritize execution of higher importance transactions.

Staking return rates developed from blockchain emission analyses, such as those described above can be implemented in various other blockchain technologies including, but not limited to: Tezos, Cardano, Solana, and Algorand blockchains.

The blockchain analysis systems 402 can include several different functional components, including network communication interfaces, computer servers, and GPUs. The network communication interfaces or computer servers, or a combination of these, can include one or more data processing apparatuses, and can be implemented in code (e.g., as virtual machines), or a combination of both. For instance, each of the computer servers can include one or more data processors and instructions that cause the one or more data processors to perform the operations discussed herein. In cloud-based systems for example, these components can be implemented by individual computing nodes of a distributed computing system.

The blockchain analysis system 402 is an example of a system implemented as computer programs on one or more computers in one or more locations, in which the systems, components, and techniques described in this specification are implemented. Any user devices used to interact with the system can include personal computers, mobile communication devices, and other devices that can send and receive data over a network. The network (not shown), such as a local area network ("LAN"), wide area network ("WAN"), the Internet, or a combination thereof, connects any user devices, the blockchain analysis system 402, and the blockchain at large. The blockchain analysis system 402 can use a single computer or multiple computers operating in conjunction with one another, including, for example, a set of remote computers deployed as a cloud computing service.

Figure 5A:
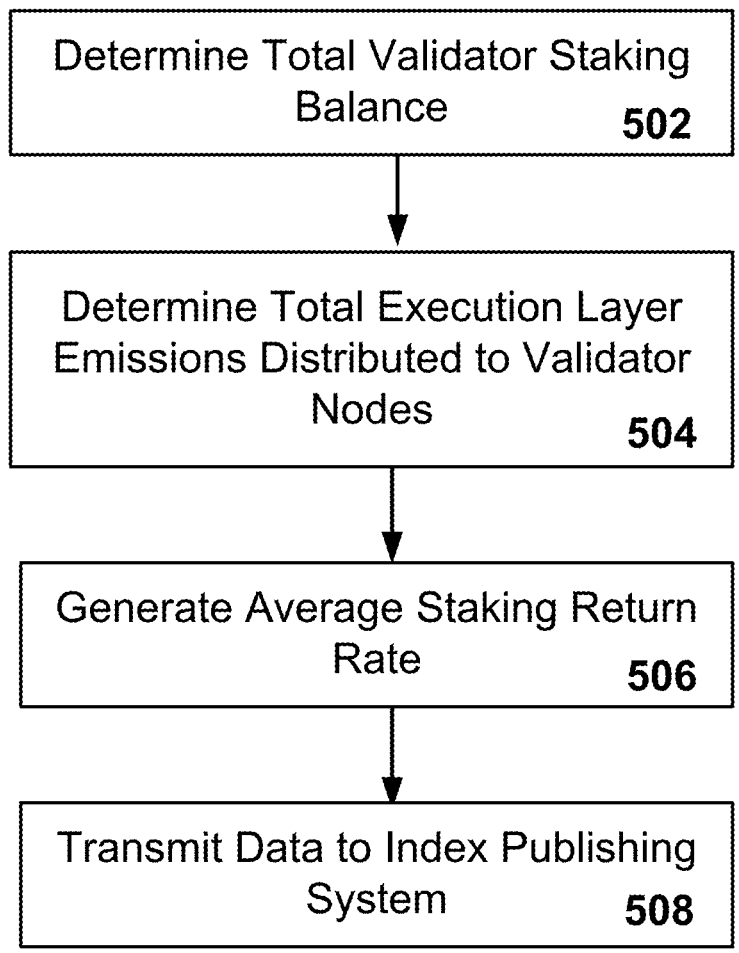
FIG. 5A is a flowchart of an example process for performing blockchain emissions analysis.
Figure 5B:
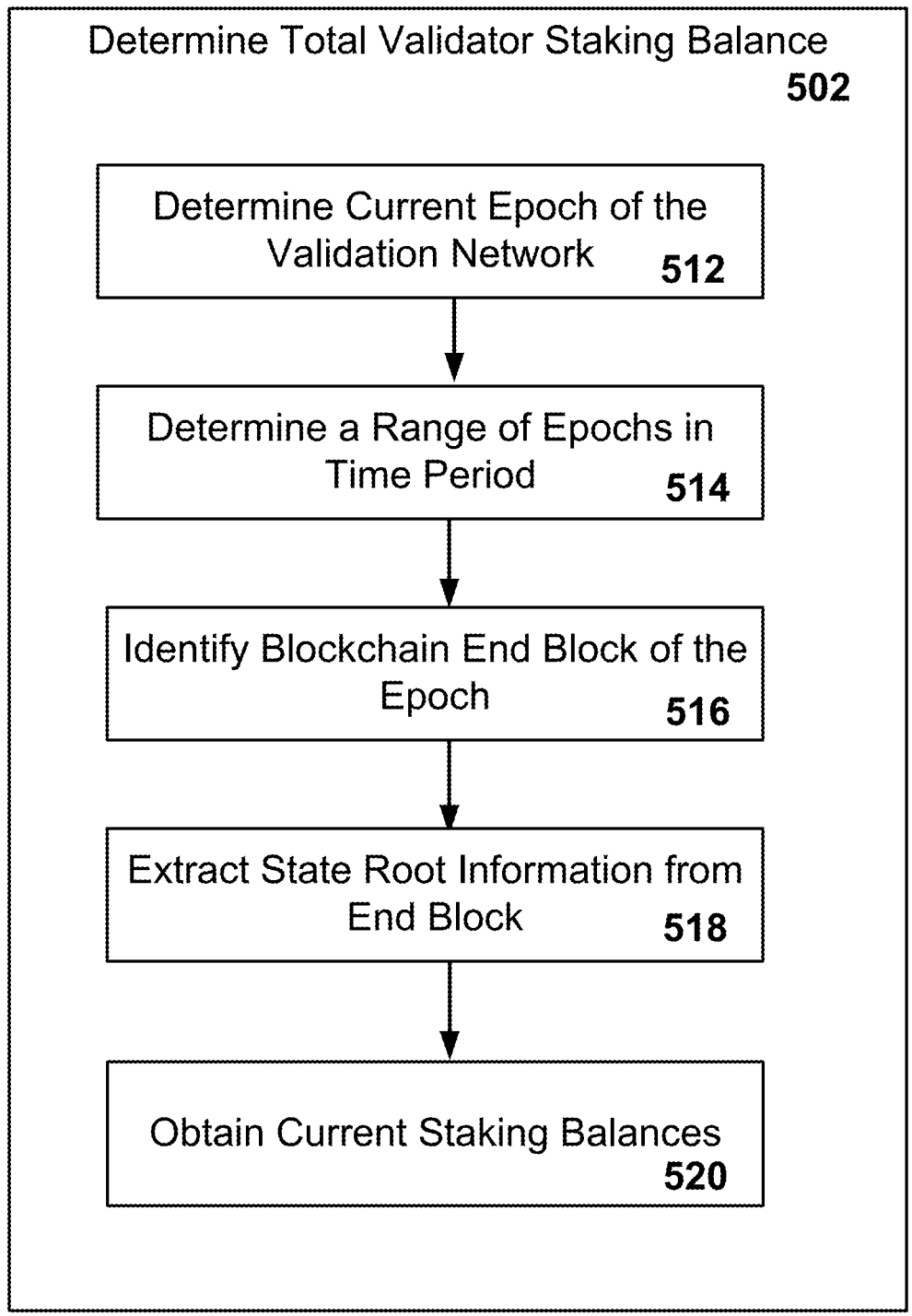
FIG. 5B is a flowchart of an example sub-process for determining staking balances of validator nodes in a blockchain validation network according to step 502 of FIG. 5B.

FIG. 5A is a flowchart of an example process 500 for performing blockchain emissions analysis. FIG. 5B is a flowchart of an example sub-process for determining staking balances of validator nodes in a blockchain validation network according to step (502). Process 500 can be executed by one or more computing systems including, but not limited to, the blockchain analysis system(s) 402 and index publication system 408, described above. Process 500 need not be performed completely by one system, but steps of the process 500 can be distributed between multiple systems or sub-systems. For example, some of the steps described below can be performed by blockchain analysis systems 402 while other steps are performed by index publication system 408. However, for clarity, process 500 will be described as being performed by a blockchain analysis system 402.

The blockchain analysis system determines a total staking balance for validator nodes over a time period (502). For example, the blockchain analysis system interfaces with one or more blockchain nodes to determine the total balance of cryptocurrency or tokens stated by validator nodes within a validation network for a blockchain. The time period can be a predetermined time period such as the observation period discussed above, e.g., 24 hours. For example, as shown and described in reference to FIGS. 4A-C the blockchain analysis system can interact with a beacon chain application program interface host (BC-API host) to determine total staking balances of validator nodes within the blockchain's validation network.

The blockchain analysis system determines a current epoch of the validation network (512). For example, the blockchain analysis system can interface with a BC-API host through an API to identify the current epoch. The blockchain analysis system can form a request message for transmission through the API. The blockchain analysis system can encapsulate the request message in a network data packet and transmit the request message to the API for the BC-API host. The API responds with a response message containing the data identifying the current epoch of the validation network. The blockchain analysis system can extract the data from the response message and store the current epoch data in a memory store, e.g., random access memory (RAM) such as a memory cache or other RAM.

The blockchain analysis system determines a range of epochs within the time period (514). For example, the blockchain analysis system can determine a range of epochs that have occurred over a period of time prior to the current epoch, e.g., during the observation period. The blockchain analysis system can access the current epoch data from RAM and determine the range of epochs that occurred over the past 24 hours. The blockchain analysis system can use one of the techniques described above for identifying epochs within the observation period to determine the range of epochs.

The blockchain analysis system identifies the last block of each epoch (516). For example, the blockchain analysis system can identify a respective end block of the blockchain added at the end of the epoch for each epoch in the range of epochs spanning the observation period. The blockchain analysis system can interact with the blockchain through the BC-API host API and identify a respective end block of each epoch. For example, the blockchain analysis system can form a request message including data identifying each epoch in the observation period, and request end block information for each epoch. The blockchain analysis system can encapsulate the request message in a network data packet and transmit the request message to the API for the BC-API host. The API responds with a response message containing the data identifying the end block for each epoch. The blockchain analysis system can extract the data from the response message and store the epoch end block data in a memory store. In some examples, the end block data includes a full or partial copy of the block of the block chain. In some examples, the end block data includes a block identifier of the end block (e.g., a block height of the end block).

The blockchain analysis system extracts state root information from the end blocks (518). For example, the blockchain analysis system can access the end block data from RAM. If the end block data includes only the block identifier (e.g., block height), the blockchain analysis system can interact with the blockchain to extract the state root information from the block at the identified block height. For example, the blockchain analysis system can query a block explorer or the BC-API host to access the block at the identified block height and obtain the state root information. If the block data includes a full or partial copy of the end blocks, the blockchain analysis system can extract the state root information from the block data stored in RAM. In some implementations, the blockchain analysis system extracts state root data for multiple end blocks (e.g., all the end blocks within the observation period). In some implementations, the blockchain analysis system extracts state root information only for the end block of the last epoch of the observation period (e.g., the current epoch or the epoch immediately preceding the current epoch).

The blockchain analysis system obtains current staking balances of validator nodes in the validation network (520). For example, the blockchain analysis system can query the BC-API host to obtain staking balances of all the validator nodes within a validation network based on the state root information of the end blocks. In some implementations, the blockchain analysis system can query for validator node balances at the end block of each epoch in the observation period. In some implementations, the blockchain analysis system can query for validator node balances only at the end block of the last epoch of the observation period. For example, the blockchain analysis system can form a request message including the state root for a given epoch or set of epochs in the observation period that requests validator node staking balances based on the state root. The blockchain analysis system can encapsulate the request message in a network data packet and transmit the request message to the API for the BC-API host. The API responds with a response message containing the requested validator staking balances. The blockchain analysis system can extract the validator staking balances from the response message and store the epoch end block data in a memory store.

In some implementations, the blockchain analysis system can use the sub process of FIG. 5B to identify staking reductions (e.g., slashes, penalties, withdrawals, etc.) for any of the validator nodes during the observation period. For example, the blockchain analysis system can request data related to any stake reductions concurrent with requesting staking balances from the BC-API host. The stake reductions data can be stored in a memory store.

The blockchain analysis system can, optionally, determine the total execution layer emissions (e.g., rewards) distributed to validator nodes over the observation period (504). The execution layer emissions can include execution layer rewards such as additional gas fees that are not burned e.g., gas tips provided to validator nodes for prioritizing blockchain transactions. For example, the blockchain analysis system can determine execution layer emissions distribution on an ongoing e.g., real-time, basis during an observation period. The blockchain analysis system can regularly interface with the BC-API host to obtain block data for each block during each epoch of the observation period. For example, at intervals (e.g., each slot time, epoch time, or block time) the blockchain analysis system can send a block request to the BC-API host to obtain updated block data. For example, the blockchain analysis system can form a request message identifying the last block processed (e.g., by block height) and requesting block data for each subsequent block added to the block chain since the last block processed. As another example, the blockchain analysis system can form a request message requesting block data for all blocks in a particular epoch or slot. The blockchain analysis system can encapsulate the request message in a network data packet and transmit the request message to the API for the BC-API host. The API responds with a response message containing the requested block data. The blockchain analysis system can extract the validator staking balances from the response message and store the block data in a memory store.

The blockchain analysis system can scan transactions processed in each block received in the block data to identify execution layer rewards provided to the validator node of that block. For example, the blockchain analysis system can access the block data from the memory store and search the block data for gas fees paid for each transaction. The blockchain analysis system can distinguish between gas fees that are subsequently burned (e.g., base gas fees) and gas fees that are paid as execution layer rewards (e.g., additional non-burned gas fees). The blockchain analysis system can maintain a running total of execution layer rewards for each observation period by repeating this process (e.g., step 504) and updating the running total with the execution layer rewards for each block until the end of the observation period.

The blockchain analysis system can, optionally, generate an average staking return rate (506). In some implementations, the blockchain analysis system can generate the average staking return rate, whereas in other implementations, the blockchain analysis system can transmit the staking balances and the total execution layer emission to another system, e.g., to generate the average staking return rate and/or for additional analyses. The blockchain analysis system can generate the average staking return rate using any of the staking return rate calculations discussed above. In some examples, the blockchain analysis system can generate the average staking return rate based on the staking balances of the validator nodes. For example, the blockchain analysis system can access stored validator staking balances from memory. The stored staking balances can be validator staking balances from a previous observation period, e.g., the end of the immediately preceding observation period. The blockchain analysis system can compute the consensus layer emissions as the difference between a total of the stored validator staking balances and the validator staking balances received for the last epoch of the present observation period. The blockchain analysis system can compute the average staking return rate based on the consensus layer emissions, e.g., $$\text{using } stakingReturnRate = \left(\sum\nolimits_{E}\left[\frac{V_n - V_m}{V_m}\right]\right)/(E-1)) * c * 225 * 365.$$

In some implementations, the blockchain analysis system can compute the average staking return rate based on both consensus layer emissions and execution layer emissions, e.g., using:

$$SR = \left(\frac{\sum_{1}^{n}\frac{(VB_{n,p} - VB_{n,p-1})}{VB_{n,p-1}}}{n} + \frac{F}{TS_{p-1}}\right) \times 365.$$

In some implementations, the blockchain analysis system can compute the average staking return rate consensus layer emissions, execution layer emissions, and account for staking reductions over the observation period, e.g., using:

$$SR = 365 \times \left(\frac{1}{n} \times \sum\nolimits_{1}^{n}\frac{(VB_{n,p} + W_n + VB_{n,p-1})}{VB_{n,p-1}} + \frac{F}{TS_{p-1}}\right).$$

The blockchain analysis system can transmit data to an index publishing system (508). For example, the blockchain analysis system can securely transmit the generated average staking return rate to an index publishing system. In some examples, the blockchain analysis system can securely transmit any combination of the validator node staking balances, the execution layer emissions, and/or the staking reductions to the index publishing system. For example, the blockchain analysis system can establish a secure transmission channel (e.g., a virtual private network connection (VPN)) with the index publishing system. The blockchain analysis system can encapsulate the data in one or more data packets and transmit the data through the VPN. In some implementations, the data can be encrypted prior to transmission.

In some implementations, the blockchain analysis system executes the processes described above using multithreading. For instance, the blockchain analysis system 402 can execute step 504 by splitting the transaction processing between multiple, e.g., 4-12 processing threads. In practice, the computation for the entire process 500 was reduced from 15-16 hours of processing to approximately 2 hours of processing time using eight processing threads. This is a significant improvement, and necessary for computing execution layer emissions within a reasonable time frame during each 24 hour observation period.

In some implementations, the Ethereum blockchain can run a program or smart contract that exists on the Ethereum blockchain. The smart contracts can act as an account and therefore participate in transactions without a user. Users can interact with the smart contract and the interactions and transactions can be validated, similar to the methods described herein.

Staking return rates developed from blockchain emission analyses, such as those described above, can be implemented in various other technologies including, but not limited to: Smart Contracts, Decentralized Finance (DeFi), and Artificial Intelligence.

Smart Contracts: Staking return rates can be embedded in smart contracts and used to trigger execution of smart contract operations. For example, staking return rates can be employed to develop valuation models and discount models for contracts involving crypto derivatives, and or digital assets denominated in Ethereum including NFTs. Staking return rates can be embedded triggers for on ramping smart contracts that trigger execution of futures, swaps, loans, crypto vs crypto staking return rates, crypto vs fiat assets such as cross-currency swaps or crypto floating staking return rates vs fiat floating interest rates (on/off ramp basis swaps).

Staking return rates may be employed within smart contracts related to Decentralized Finance (DeFi) operations. For example, staking return rates can be embedded in smart contracts for automated treasury management in DeFi. Variations in staking return rate can trigger execution of changes in allocation of treasury assets within a DeFi system.

Artificial Intelligence: Staking return rates and/or staking return rate histories/trends can be employed to train machine learning systems. For example, machine learning systems that model pricing or other blockchain data can incorporate staking return rates as training data. Examples include, but are not limited to, algorithmic pricing models such as expected shortfall algorithms, risk models, stress modeling, or models to predict momentum/trends of staking return rates.

The techniques described above for monitoring blockchain emissions can be incorporated into various other analyses aside from the staking return rate (SR). For example, blockchain emissions data can be used to generate analysis data including, but not limited to, a Nominal Staking Yield (SY) and Inflation Rate (IR).

For instance, Ethereum's transition to a proof-of-stake (PoS) validation mechanism is a historic moment for the crypto industry. In accordance with protocol governance and EIP-1559, validators will continue to be awarded transaction fees, or "tips," for validating transactions. While the SR focuses on the rate of new protocol emissions, an Ethereum Staking Yield (SY) includes new PoS protocol emissions plus transaction fees (known as "tips" or "priority fees") that may be rewarded to validators from Ethereum in existing circulation. This secondary income stream for validators, previously paid to Proof of Work miners alongside the block subsidy, must be considered for a holistic perspective of the earnings of validators after the merge.

Before EIP-1559 and the London hard fork, which took place in August of 2021, all participants wishing to send transactions would manually set a gas price in GWEI (a denomination of ETH) within their wallet. Wallets would dynamically monitor the network in order to suggest reasonable prices, but these were still subject to frequent volatility.

After the hard fork the fee was split into two components: the base fee and priority fee. The base fee is set by the network and adjusts less frequently than before, giving a higher degree of certainty to participants that their transactions will be burned in a timely manner. The entirety of the base fee paid by users is burned (removed from circulation). There is also the priority fee, or 'miner tips' that a user can elect to pay. These are additional fees that are paid directly to the block proposer on the execution layer.

The incorporation of execution layer fees allows for two additional rates to be calculated: the nominal yield rate and the overall network inflation rate.

Nominal Staking Yield (SY)

The staking yield is a measure of the total expected return on a stake that a validator can expect, inclusive of both consensus layer new emissions in the form of block and attestation rewards, and also fees paid to the validator on the execution layer from priority fee transactions. The rate can be defined mathematically as:

$$YS = (SR + \text{fees})$$

The new rate incorporates the rate already determined by the SR and adds onto it the additional percent return associated with the fees a validator collected.

Fees paid to validators can be determined by multiplying the gas price of the priority fee in each transaction in a block by the total amount of gas used for that transaction. Because there are fixed 12 second block times on the beacon chain, roughly 7200 blocks will need to be analyzed each day. (Note: although slot times are fixed, there is also the possibility that a particular slot does not have a block in it. In these cases, the slot is simply skipped). At each block all transactions will be queried from an Ethereum node (or more generally a node for a PoS blockchain), and the above calculation is applied to each then added to a running total.

Inflation Rate (IR)

Priority fees are only a small percentage of the fees paid in a normal Ethereum transaction. The rest are known as the 'base fee'. The base fee price is set by the network and is meant to target blocks that are 50% full. It adjusts after each block. A transaction will pay its base fee then optionally pay an additional fee for speedy inclusion in a block. All ETH paid in the base fee is burned by the network, opening the possibility for net issuance of ETH to be deflationary if network activity remains above a certain threshold. The net issuance of the network can be measured by:

$$(\text{emittedETH} - \text{burnedETH})/\text{totalCirculatingSupply} \quad (7)$$

This value builds upon the numerator of the SR (the new emitted ETH for a given period) and subtracts the burned eth from the execution layer fee burn. Burned fees can be determined by multiplying the baseFeePerGas by the gasUsed data fields contained in each block. The denominator in this case is total circulating supply, not total active (e.g., staked) supply.

Data sharding is slated for a future upgrade. Under sharding, Ethereum will be split in 64 semi-independent shards in order to facilitate scaling. Validators will be rewarded for facilitating cross shard communication as well as receiving beacon chain block rewards. This upgrade is planned for much farther into the future. As there is no official specification released for this upgrade, it remains to be seen how this could affect the model.

While the present application discusses validation network analysis processes within the context of the Ethereum blockchain, such processes can be applied to other proof-of-stake blockchains.

A number of implementations have been described. Nevertheless, it will be understood that various modifications can be made without departing from the spirit and scope of the disclosure. For example, various forms of the flows shown above can be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, a data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. One or more computer storage media can include a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can be or include special purpose logic circuitry, e.g., a field programmable gate array ("FPGA") or an application-specific integrated circuit ("ASIC"). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can be performed by, and apparatus can also be implemented as, special purpose logic circuitry, e.g., a field programmable gate array ("FPGA") or an application-specific integrated circuit ("ASIC").

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. A computer can be embedded in another device, e.g., a mobile telephone, a smart phone, a headset, a personal digital assistant ("PDA"), a mobile audio or video player, a game console, a Global Positioning System ("GPS") receiver, or a portable storage device, e.g., a universal serial bus ("USB") flash drive, to name just a few.

Computer-readable media suitable for storing computer program instructions and data includes all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a liquid crystal display ("LCD"), an organic light emitting diode ("OLED") or other monitor, for displaying information to the user and a keyboard and a pointing device, e.g., a mouse, a trackball or a touchscreen, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. In some examples, a computer can interact with a user by sending documents to and receiving documents from a device that is in use by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers, which have a client-server relationship to each other. In some implementations, a server transmits data, e.g., a Hypertext Markup Language ("HTML") page, to a user device, e.g., for purposes of displaying data to and receiving user input from a user device, which acts as a client. Data generated at the user device, e.g., a result of user interaction with the user device, can be received from the user device at the server.

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a blockchain emission analysis method executed by one or more processors, the method comprising operations of: determining a current epoch of a validation network associated with a proof-of-stake blockchain; determining, based on the current epoch, a range of epochs that have occurred over a period of time prior to the current epoch; identifying, from within each epoch in the range of epochs, a respective end block of the blockchain added at the end of the epoch; extracting state root information from each end block, the state root information providing a state of the blockchain at a time that each end block was added to the blockchain; determining, based on the state root information, staking balances for a plurality of validator nodes within the validation network; and generating, based on the staking balances, an average staking return rate.

Embodiment 2 is a blockchain emission analysis method comprising: determining a current epoch of validation network associated with a proof-of-stake blockchain including by forming a request message and transmitting the request message to an application program interface (API) of a beacon chain node then receiving a response message containing data identifying a current epoch in the validation network; storing the epoch data in random access memory (RAM); accessing the epoch data from RAM and determining, based on the current epoch, a range of epochs that have occurred over a period of time prior to the current epoch; interacting with the blockchain through the beacon chain node API and identifying, from within each epoch in the range of epochs, a respective end block of the blockchain at the end of the respective epoch; accessing, through the beacon chain node API, end block data associated with each end block of the blockchain within the range of epochs and storing the end block data in RAM; accessing the end block data from RAM and extracting state root information for each end block, the state root information providing a state of the blockchain at a time that each end block was appended to the blockchain; querying a beacon chain API host (BC-API host) for current staking balances for a plurality of validator nodes within the validation network including by transmitting, to the BC-API host, the state root information, and receiving the current staking balances in response; accessing, from memory, stored staking balances, the stored staking balances representing validator staking balances from a previous time period; determining, based on the staking balances and the stored staking balances, a total amount of consensus layer emissions distributed to the validator nodes over the time period; generating, based on the staking balances and the total amount of consensus layer emissions distributed to the plurality of validator nodes, an average staking return rate; and establishing a secure transmission channel with an index publishing system and securely transmitting the average staking return rate to the index publishing system using the secure transmission channel.

Embodiment 3 is a computer-implemented blockchain emission analysis method executed by one or more processors, the method comprising operations of: determining, for a time period, a total staking balance for a plurality of validator nodes within a validation network of a blockchain network; determining, based on the staking balances, a total amount of consensus layer emissions distributed to the plurality of validator nodes; determining a total amount of execution layer emissions distributed to validator nodes over the time period; generating, based on the staking balances and the total amount of consensus and execution layer emissions distributed to the plurality of validator nodes, an average staking return rate; and securely transmitting the average staking return rate to an index publishing system.

Embodiment 4 is a blockchain emission analysis method executed by one or more processors, the method comprising: identifying, from within each epoch in a range of epochs of a blockchain validation network, a respective end block of the blockchain added at the end of the epoch; determining, based on state root information contained in each respective end block, staking balances for a plurality of validator nodes within the validation network; and generating, based on the staking balances, an average staking return rate.

Embodiment 5 is the method of embodiment 4 further comprising: determining, from the end blocks, a total amount of gas used for transactions occurring on the blockchain during the range of epochs; and generating a staking yield from the average staking return rate and the total amount of gas.

Embodiment 6 is the method of embodiment of any one of the previous embodiments wherein determining the current epoch comprises sending a query to an application programming interface associated with the validation network for the proof-of-stake blockchain.

Embodiment 7 is the method of any one of the previous embodiments, wherein the state root information comprises a root hash of a Merkle tree that stores a current state of network nodes associated with the blockchain.

Embodiment 8 is the method of any one of the previous embodiments, wherein determining the current epoch comprises executing a call to a beacon chain application programming interface (API) of the validation network.

Embodiment 9 is the method of embodiment 8, wherein executing the call to the beacon chain comprises a call to /api/v1/epoch/{epoch}.

Embodiment 10 is the method of any one of the previous embodiments, wherein determining the range of epochs comprises selecting an epoch that occurred a predetermined number of epochs prior to the current epoch as an endpoint epoch of the range of epochs; and selecting the range of epochs to include a predetermined number of epochs that occurred prior to the endpoint epoch.

Embodiment 11 is the method of any one of the previous embodiments, wherein determining the staking balances for the plurality of validator nodes within the validation network comprises: for each state root contained in the state root information, executing an application programing interface (API) call to a beacon chain client associated with the validator network to obtain validator staking balances for each epoch associated with the state root; and determine a total validator stake balance per epoch.

Embodiment 12 is the method of any one of the previous embodiments further comprising generating a staking coefficient based on the staking balances associated with the validator nodes, wherein the staking coefficient is a data standardization value that accounts for network staking differences between epochs, wherein generating the staking coefficient comprises: determining a first stake amount representing a total validator stake amount as of the current epoch; determining a second stake amount representing a moving average of the total validator stake amount over the range of epochs; and determining the staking coefficient as the ratio of the first stake amount to the second stake amount.

Embodiment 13 is the method of any one of the previous embodiments, wherein the operations are performed at particular times according to a defined time interval.

Embodiment 14 is the method of embodiment 13, wherein the particular time is a time of day less an estimated computational time to perform the operations.

Embodiment 15 is the method of any one of the previous embodiments comprising monitoring operation of the validation network, and wherein the operations are initiated at a particular time in response to detecting that the validation network status is operating normally at the particular time.

Embodiment 16 is the method of any one of the previous embodiments comprising monitoring operation of the validation network, and wherein the operations are not performed at a particular time in response to detecting that the validation network status is not operating normally at the particular time.

Embodiment 17 is the method of any one of the previous embodiments comprising monitoring operation of the validation network, and wherein in response to detecting that the validation network status is not operating normally at a particular time, delaying performance of the operations for at least one time interval from the particular time.

Embodiment 18 is the method of any one of the previous embodiments comprising: determining, from the end blocks, a total amount of gas used for transactions occurring on the blockchain during the range of epochs; and generating a staking yield from the average staking return rate and the total amount of gas.

Embodiment 19 is a computer-implemented blockchain emission analysis method executed by one or more processors, the method comprising: determining a current epoch of validation network associated with a proof-of-stake blockchain; determining, based on the current epoch, a range of epochs that have occurred over a period of time prior to the current epoch; identifying, from within each epoch in the range of epochs, a respective end block of the blockchain added at the end of the epoch; extracting state root information from each end block, the state root information providing a state of the blockchain at a time that each end block was added to the blockchain; determining, from a beacon chain node associated with the proof-of-stake blockchain and based on the state root information, staking balance histories for a plurality of validator nodes within the validation network; and sending the staking balances to a third-party server.

Embodiment 20 is a blockchain emission analysis method comprising: determining a current epoch of validation network associated with a proof-of-stake blockchain including by forming a request message and transmitting the request message to an application program interface (API) of a beacon chain node then receiving a response message containing data identifying a current epoch in the validation network; storing the epoch data in random access memory (RAM); accessing the epoch data from RAM and determining, based on the current epoch, a range of epochs that have occurred over a period of time prior to the current epoch; interacting with the blockchain through the beacon chain node API and identifying, from within each epoch in the range of epochs, a respective end block of the blockchain at the end of the respective epoch; accessing, through the beacon chain node API, end block data associated with each end block of the blockchain within the range of epochs and storing the end block data in RAM; accessing the end block data from RAM and extracting state root information for each end block, the state root information providing a state of the blockchain at a time that each end block was appended to the blockchain; querying a beacon chain API host (BC-API host) for current staking balances for a plurality of validator nodes within the validation network including by transmitting, to the BC-API host, the state root information, and receiving the current staking balances in response; and establishing a secure transmission channel with an index publishing system and securely transmitting the staking balances to the index publishing system using the secure transmission channel.

Embodiment 21 is a blockchain emission analysis method executed by one or more processors, the method comprising: identifying, from within each epoch in a range of epochs of a blockchain validation network, a respective end block of the blockchain added at the end of the epoch; determining, based on state root information contained in each respective end block, staking balances for a plurality of validator nodes within the validation network; and sending the staking balances to a third-party server.

Embodiment 22 is the method of embodiment 21, further comprising determining, from the end blocks, a total amount of gas used for transactions occurring on the blockchain during the range of epochs, wherein sending the staking balances to the third-party server comprises sending the staking balances and the total amount of gas used to the third-party server.

Embodiment 23 is the method of any one of embodiments 19 through 22, further comprising determining, from the end blocks, a total amount of gas used for transactions occurring on the blockchain during the range of epochs, wherein sending the staking balances to the third-party server comprises sending the staking balances and the total amount of gas used to the third-party server.

Embodiment 24 is the method of any one of the previous embodiments further comprising: generating, based on the staking balances and the total amount of consensus layer emission, an average consensus layer emission rate; generating, based on the staking balances and the total amount of execution layer emission, an average execution layer emission rate; and securely transmitting the average consensus layer emission rate and the average execution layer emission rate to the index publishing system.

Embodiment 25 a system comprising: at least one processor; and a data store coupled to the at least one processor having instructions stored thereon which, when executed by the at least one processor, causes the at least one processor to perform the method of any one of claims 1-24.

Embodiment 26 a non-transitory computer readable storage device storing instructions that, when executed by at least one processor, cause the at least one processor to perform the method of any one of claims 1-24.

Embodiment 27 system comprising: a server system hosting a beacon chain node for a proof-of-stake blockchain, the server system comprising a data store having instructions stored thereon which, when executed by the at least one processor of the server system, causes the server system to perform operations comprising: determining a current epoch of validation network associated with the proof-of-stake blockchain; determining, based on the current epoch, a range of epochs that have occurred over a period of time prior to the current epoch; identifying, from within each epoch in the range of epochs, a respective end block of the blockchain added at the end of the epoch; extracting state root information from each end block, the state root information providing a state of the blockchain at a time that each end block was added to the blockchain; obtaining, from the beacon chain node and based on the state root information, staking balances for a plurality of validator nodes within the validation network; and sending the staking balances to a third-party server.

Embodiment 28 is the system of embodiment 27, where the operations further comprising determining, from the end blocks, a total amount of gas used for transactions occurring on the blockchain during the range of epochs, wherein sending the staking balances to the third-party server comprises sending the staking balances and the total amount of gas used to the third-party server.

Definitions

Slot: A slot is an opportunity for a new block to be added to the canonical chain. Validators compete to include blocks they have built in one of 32 slots during each epoch in exchange for a reward. Their reward scales based upon the number of attestations that they include. Slots may or may not have a block in them. Slots with no block are considered 'missed'.

Epoch: Epochs are collections of 32 slots that occur every ~6 minutes. At each epoch rewards are processed by the network (they are not rewarded in real time, but must wait for finalization) as well as validator exits and entries. Attestation committees are also shuffled at the beginning of each epoch to prevent collusion.

Attestation: Attestations are votes produced by validators to verify the validity of blocks in exchange for a reward, which is generally smaller than that of proposing a block. Validators are expected to attest correctly and continuously or risk penalties. The total rewards of the network scale proportionally with the number of attesters active.

Block: Blocks are the basic unit of any blockchain, containing timestamp data, signature data, attestations, and a bundle of included transactions. Once included and finalized, a block cannot be changed.

Checkpoint: The checkpoint on the eth beacon chain is the latest epoch for which finality has been established. Typically it is current_epoch-1, but may extend beyond this. If finality is not established by current_epoch-4, then all validators on the network receive a penalty.

Beacon chain client: A beacon chain client is the software that allows a user to interact with the beacon chain for acquiring data, sending transactions, and running a validator. It establishes a peer-to-peer connection to other validators and remains up to date with the network state.

Validator: Validators are actors on the network that actively produce and propose blocks and attest to transactions. These are the only actors that receive rewards on the network. A minimum balance of 32 ETH is required to activate a validator.

Total Active Stake: The total active stake of the network is the sum of all validator staking balances in Ethereum at any given time. As the total stake of the network rises, the overall rewards to any one validator go down Block Reward: The block reward is the amount of ETH paid to successful block proposers.

The invention claimed is:

1. A blockchain emission analysis method comprising:
   determining a current epoch of a validation network associated with a proof-of-stake blockchain including by forming a request message and transmitting the request message to an application program interface (API) of a beacon chain node then receiving a response message containing data identifying a current epoch in the validation network;
   storing the epoch data in random access memory (RAM);
   accessing the epoch data from RAM and determining, based on the current epoch, a range of epochs that have occurred over a period of time prior to the current epoch;
   interacting with the blockchain through the beacon chain node API and identifying, from within each epoch in the range of epochs, a respective end block of the blockchain at the end of the respective epoch;
   accessing, through the beacon chain node API, end block data associated with each end block of the blockchain within the range of epochs and storing the end block data in RAM;
   accessing the end block data from RAM and extracting state root information for each end block, the state root information providing a state of the blockchain at a time that each end block was appended to the blockchain;
   querying a beacon chain API host (BC-API host) for current staking balances for a plurality of validator nodes within the validation network including by transmitting, to the BC-API host, the state root information, and receiving the current staking balances in response; and
   establishing a secure transmission channel with an index publishing system and securely transmitting blockchain emissions data to the index publishing system using the secure transmission channel, the blockchain emissions data being based on the staking balances.

2. The method of claim 1, wherein the state root information comprises a root hash of a Merkle tree that stores a current state of network nodes associated with the blockchain.

3. The method of claim 1, wherein determining the current epoch comprises executing a call to a beacon chain application programming interface (API) of the validation network.

4. The method of claim 1, wherein determining the range of epochs comprises:
   selecting an epoch that occurred a predetermined number of epochs prior to the current epoch as an endpoint epoch of the range of epochs; and
   selecting the range of epochs to include a predetermined number of epochs that occurred prior to the endpoint epoch.

5. The method of claim 1, wherein querying the BC-API host for current staking balances comprises:
for each state root contained in the state root information, executing an application programing interface (API) call to a beacon chain client associated with the validator network to obtain validator staking balances for each epoch associated with the state root; and
determining a total validator stake balance per epoch.

6. The method of claim 1, wherein operations of the method are performed at particular times according to a defined time interval, wherein the particular time is a time of day less an estimated computational time to perform the operations.

7. The method of claim 1, further comprising generating an average staking return rate by performing operations comprising:
determining, based on the staking balances, a total amount of consensus layer emissions distributed to the plurality of validator nodes;
determining a total amount of execution layer emissions distributed to validator nodes over the time period; and
generating the average staking return rate, based on the staking balances and the total amount of consensus and execution layer emissions distributed to the plurality of validator nodes.

8. The method of claim 7, wherein determining the total amount of execution layer emissions distributed to validator nodes over the time period comprises:
obtaining, from a blockchain API host, obtain block data for each block within the range of epochs; and
extracting, from each block, execution layer rewards provided to validator nodes.

9. The method of claim 8, wherein determining execution layer rewards are extracted from each block using a multi-threaded processing where execution layer rewards are extracted from a first set of blocks using a first processing thread and wherein execution layer rewards are extracted from a second set of blocks using a second, different, processing thread.

10. A system comprising:
a server system hosting a beacon chain node for a proof-of-stake blockchain, the server system comprising a data store having instructions stored thereon which, when executed by at least one processor of the server system, causes the server system to perform operations comprising:
determining a current epoch of a validation network associated with a proof-of-stake blockchain including by forming a request message and transmitting the request message to an application program interface (API) of a beacon chain node then receiving a response message containing data identifying a current epoch in the validation network;
storing the epoch data in random access memory (RAM);
accessing the epoch data from RAM and determining, based on the current epoch, a range of epochs that have occurred over a period of time prior to the current epoch;
interacting with the blockchain through the beacon chain node API and identifying, from within each epoch in the range of epochs, a respective end block of the blockchain at the end of the respective epoch;
accessing, through the beacon chain node API, end block data associated with each end block of the blockchain within the range of epochs and storing the end block data in RAM;
accessing the end block data from RAM and extracting state root information for each end block, the state root information providing a state of the blockchain at a time that each end block was appended to the blockchain;
querying a beacon chain API host (BC-API host) for current staking balances for a plurality of validator nodes within the validation network including by transmitting, to the BC-API host, the state root information, and receiving the current staking balances in response; and
establishing a secure transmission channel with an index publishing system and securely transmitting blockchain emissions data to the index publishing system using the secure transmission channel, the blockchain emissions data being based on the staking balances.

11. The system of claim 10, wherein determining the range of epochs comprises:
selecting an epoch that occurred a predetermined number of epochs prior to the current epoch as an endpoint epoch of the range of epochs; and
selecting the range of epochs to include a predetermined number of epochs that occurred prior to the endpoint epoch.

12. The system of claim 10, wherein querying the BC-API host for current staking balances comprises:
for each state root contained in the state root information, executing an application programing interface (API) call to a beacon chain client associated with the validator network to obtain validator staking balances for each epoch associated with the state root; and
determining a total validator stake balance per epoch.

13. The system of claim 10, wherein the operations are performed at particular times according to a defined time interval, wherein the particular time is a time of day less an estimated computational time to perform the operations.

14. The system of claim 10, further comprising generating an average staking return rate by performing operations comprising:
determining, based on the staking balances, a total amount of consensus layer emissions distributed to the plurality of validator nodes;
determining a total amount of execution layer emissions distributed to validator nodes over the time period; and
generating the average staking return rate, based on the staking balances and the total amount of consensus and execution layer emissions distributed to the plurality of validator nodes.

15. The system of claim 14, wherein determining the total amount of execution layer emissions distributed to validator nodes over the time period comprises:
obtaining, from a blockchain API host, obtain block data for each block within the range of epochs; and
extracting, from each block, execution layer rewards provided to validator nodes.

16. The system of claim 15, wherein determining execution layer rewards are extracted from each block using a multithreaded processing where execution layer rewards are extracted from a first set of blocks using a first processing thread and wherein execution layer rewards are extracted from a second set of blocks using a second, different, processing thread.

17. A non-transitory computer readable storage device storing instructions that, when executed by at least one processor, cause the at least one processor to perform operations comprising:

determining a current epoch of a validation network associated with a proof-of-stake blockchain including by forming a request message and transmitting the request message to an application program interface (API) of a beacon chain node then receiving a response message containing data identifying a current epoch in the validation network;

storing the epoch data in random access memory (RAM);

accessing the epoch data from RAM and determining, based on the current epoch, a range of epochs that have occurred over a period of time prior to the current epoch;

interacting with the blockchain through the beacon chain node API and identifying, from within each epoch in the range of epochs, a respective end block of the blockchain at the end of the respective epoch;

accessing, through the beacon chain node API, end block data associated with each end block of the blockchain within the range of epochs and storing the end block data in RAM;

accessing the end block data from RAM and extracting state root information for each end block, the state root information providing a state of the blockchain at a time that each end block was appended to the blockchain;

querying a beacon chain API host (BC-API host) for current staking balances for a plurality of validator nodes within the validation network including by transmitting, to the BC-API host, the state root information, and receiving the current staking balances in response; and establishing a secure transmission channel with an index publishing system and securely transmitting blockchain emissions data to the index publishing system using the secure transmission channel, the blockchain emissions data being based on the staking balances.

18. The non-transitory computer readable storage device of claim 17, further comprising generating an average staking return rate by performing operations comprising:

determining, based on the staking balances, a total amount of consensus layer emissions distributed to the plurality of validator nodes;

determining a total amount of execution layer emissions distributed to validator nodes over the time period; and generating the average staking return rate, based on the staking balances and the total amount of consensus and execution layer emissions distributed to the plurality of validator nodes.

19. The non-transitory computer readable storage device of claim 18, wherein determining the total amount of execution layer emissions distributed to validator nodes over the time period comprises:

obtaining, from a blockchain API host, obtain block data for each block within the range of epochs; and extracting, from each block, execution layer rewards provided to validator nodes.

20. The non-transitory computer readable storage device of claim 19, wherein determining execution layer rewards are extracted from each block using a multithreaded processing where execution layer rewards are extracted from a first set of blocks using a first processing thread and wherein execution layer rewards are extracted from a second set of blocks using a second, different, processing thread.

* * * * *